(12) United States Patent
Wachter et al.

(10) Patent No.: US 9,612,114 B2
(45) Date of Patent: Apr. 4, 2017

(54) ACCESS NETWORK NODE BASED BAROMETRIC REFERENCE PRESSURE NETWORK

(71) Applicant: QUALCOMM Incorporated, San Diego, CA (US)

(72) Inventors: Andreas Klaus Wachter, Menlo Park, CA (US); Kirk Allan Burroughs, Alamo, CA (US); Lionel Jacques Garin, Palo Alto, CA (US); Stephen William Edge, Escondido, CA (US); Bruce Everett Wilson, Palo Alto, CA (US); Carlos Manuel Puig, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 14/022,734

(22) Filed: Sep. 10, 2013

(65) Prior Publication Data

US 2014/0200846 A1    Jul. 17, 2014

Related U.S. Application Data

(60) Provisional application No. 61/751,920, filed on Jan. 13, 2013, provisional application No. 61/874,833, filed on Sep. 6, 2013.

(51) Int. Cl.
*G01L 7/00* (2006.01)
*G01C 5/06* (2006.01)

(52) U.S. Cl.
CPC ..................... *G01C 5/06* (2013.01)

(58) Field of Classification Search
None
See application file for complete search history.

(56) References Cited

U.S. PATENT DOCUMENTS

| | | | |
|---|---|---|---|
| 5,402,116 A | 3/1995 | Ashley | |
| 6,518,918 B1 * | 2/2003 | Vannucci | G01O 5/06 137/81.1 |

(Continued)

FOREIGN PATENT DOCUMENTS

| | | |
|---|---|---|
| EP | 1154231 A1 | 11/2001 |
| WO | WO-2007109618 | 9/2007 |

OTHER PUBLICATIONS

Nosowitz D., "So, Um, Why Does the New Google Phone Have a Barometer in It?," Posted on Oct. 19, 2011, 2 pages.

(Continued)

*Primary Examiner* — Aditya Bhat
(74) *Attorney, Agent, or Firm* — Silicon Valley Patent Group LLP

(57) ABSTRACT

Systems, apparatus and methods for populating and using a pressure database to determine an altitude of a unit with an unknown altitude are presented. A pressure from one or more barometric pressure sensors linked to respective base stations are interpolated to determine a reference pressure (e.g., at sea level) at arbitrary coordinates (x,y) having pressure reading. For example, a mobile station at the arbitrary coordinates (x,y) records a pressure at the mobile station. A difference between this pressure at the mobile station and the interpolated reference pressure is determined, which may directly be interpreted as a defined altitude of the mobile station.

16 Claims, 14 Drawing Sheets

(56) References Cited

U.S. PATENT DOCUMENTS

| | | |
|---|---|---|
| 7,263,442 B2 | 8/2007 | Eckel |
| 7,471,243 B2 | 12/2008 | Roslak |
| 7,792,640 B2 | 9/2010 | Swope et al. |
| 8,712,713 B2 | 4/2014 | Wolf et al. |
| 2010/0049469 A1* | 2/2010 | Wirola .................... G01O 5/06 702/150 |
| 2011/0057836 A1* | 3/2011 | Ische .................... G01S 5/0009 342/357.43 |
| 2012/0072110 A1 | 3/2012 | Venkatraman |
| 2012/0083286 A1 | 4/2012 | Kim et al. |
| 2012/0182180 A1* | 7/2012 | Wolf ....................... G01S 5/021 342/357.29 |

OTHER PUBLICATIONS

International Search Report and Written Opinion—PCT/US2013/078506—ISA/EPO—Apr. 10, 2014.

\* cited by examiner

At a location server (assuming coordinates (x,y) and altitude (z) of base station/barometric pressure sensor already known)

At a location server

ACCESS NETWORK NODE BASED BAROMETRIC REFERENCE PRESSURE NETWORK

CROSS-REFERENCE TO RELATED APPLICATIONS

This application claims priority to U.S. Application Ser. No. 61/751,920, entitled "Access network node based barometric reference pressure network," which was filed on Jan. 13, 2013, is assigned to the assignee hereof, and is expressly incorporated herein by reference. This application also claims priority to U.S. Application Ser. No. 61/874,833, entitled "Access network node based barometric reference pressure network," which was filed on Sep. 6, 2013, is assigned to the assignee hereof, and is expressly incorporated herein by reference.

BACKGROUND

I. Field of the Invention

This disclosure relates generally to systems, apparatus and methods for wireless determination of an altitude of a mobile station, and more particularly to determine an altitude of a mobile station based on a barometric pressure sensor measurement at one or more base stations and at the mobile station.

II. Background

Barometric pressure sensors in mobile stations can be used to determine a mobile station's altitude above sea level (or other reference altitude) by comparing the measured barometric pressure at the mobile station's location (coordinates (x,y)) with the barometric pressure theoretically at the reference altitude at the same horizontal coordinates (x,y). The computed pressure difference can then be used to calculate the mobile station's altitude above sea level. Without knowledge of the theoretical atmospheric pressure at sea level (or some other reference altitude), the mobile station's altitude cannot be determined.

The barometric pressure at sea level is typically available through a network of weather stations. Weather stations, however, are usually only coarsely deployed in specific geographic locations (e.g., airports, etc.). To obtain the barometric pressure at sea level at locations other than the weather stations, the pressure data obtained from the network of weather stations needs to be interpolated (in space and time). Problems arise when timeliness and the geographical density of weather stations are not high enough to provide an accurate barometric pressure reference throughout the mobile station's service area at an arbitrary time. Under these circumstances, the calculated altitude may lack accuracy and—depending on the particular application—may not be usable at all (e.g., first responders trying to determine the floor number within a building of a caller in distress).

Therefore, what is needed is a manner to more accurately determine an altitude of a mobile station.

BRIEF SUMMARY

Disclosed are systems, apparatus and methods for populating and using a pressure database to determine an altitude of a unit with an unknown altitude. A pressure from one or more barometric pressure sensors linked to respective base stations are interpolated to determine a reference pressure (e.g., at sea level) at arbitrary coordinates (x,y) having pressure reading. For example, first unit (e.g., a mobile station or a base station) at the arbitrary coordinates (x,y) records a pressure at the mobile station. A difference between this pressure at the mobile station and the interpolated reference pressure is determined, which may directly be interpreted as a defined altitude of the mobile station.

According to some aspects, disclosed is a method for determining an altitude of a first unit, the method comprising: obtaining a measured pressure of the first unit; obtaining coordinates (x,y) of the first unit; and estimating an estimated pressure for the coordinates (x,y) at a reference altitude; determining the altitude of the first unit based on a difference of: the measured pressure of the first unit; and the estimated pressure at the reference altitude.

According to some aspects, disclosed is a location server for determining an altitude of a first unit, the location server comprising: a receiver; a processor coupled to the receiver and configured to: obtain a measured pressure from a first unit; obtain coordinates (x,y) of the first unit; estimate an estimated pressure for the coordinates (x,y) at a reference altitude; and determine the altitude of the first unit based on a difference of: the measured pressure received of the first unit; and the estimated pressure at the reference altitude.

According to some aspects, disclosed is a location server for determining an altitude, the location server comprising: means for obtaining a measured pressure from a first unit; means for obtaining coordinates (x,y) of the first unit; and means for estimating an estimated pressure for the coordinates (x,y) at a reference altitude; means for determining the altitude of the first unit based on a difference of: the measured pressure of the first unit; and the estimated pressure at the reference altitude.

According to some aspects, disclosed is a non-transient computer-readable storage medium to determine an altitude, the non-transient computer-readable storage medium including program code stored thereon, comprising program code for enabling hardware to: obtain a measured pressure from a first unit; obtain coordinates (x,y) of the first unit; and estimate an estimated pressure for the coordinates (x,y) at a reference altitude; determine the altitude for the first unit based on a difference of: the measured pressure of the first unit; and the estimated pressure at the reference altitude.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
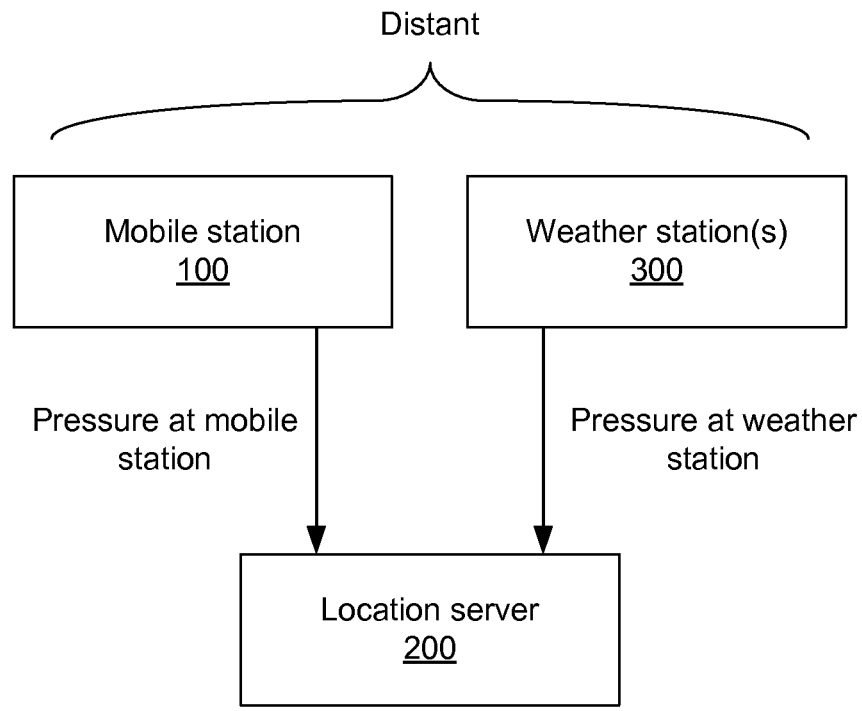
FIG. 1 shows a location server determining an altitude of a mobile station based on pressure at one or more distant weather stations.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA and LTE are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as the U.S. Global Positioning System (GPS), the European Galileo system, the Russian GLONASS system or the Chinese Compass system may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, the term mobile station (e.g., mobile station 100 or MS 100) described later in FIG. 1), may refer to a mobile device or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" or "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" or "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station" or "mobile device."

FIG. 1 shows a location server 200 determining an altitude of a mobile station 100 based on pressure at one or more distant weather stations 300. The location server 200 may be a location server for the Secure User Plane Location (SUPL) location solution defined by the Open Mobile Alliance (OMA) in which case the location server may be referred to as a SUPL Location Platform (SLP). The location server 200 may instead be a location server for the 3GPP control plane location solution defined in 3GPP Technical Specifications (TSs) 23.271, 43.059, 25.305 and 36.305. In this case, the location server 200 may be referred to as a Serving Mobile Location Center (SMLC), a Standalone SMLC (SAS) or an Enhanced SMLC (E-SMLC).

A mobile station 100 and a weather station 300 could be separated by several miles to several hundred miles (e.g., mobile station in San Francisco and weather station 20 miles away at the SFO airport). Each weather station 300 periodically (e.g., once per hour) or at non-regular intervals sends the location server 200 pressure sensed at the weather station 300. The pressure may be the actual pressure itself for the altitude of the weather station 300. Alternatively, the pressure may be adjusted to a reference altitude 504. Typically, the reference altitude 504 is sea level (e.g., zero meter or zero feet). The pressure from at the weather station 300 is adjusted to the reference altitude 504 (e.g., sea level) by either the weather station 300 or the location server 200. In some embodiments, weather station 300 may send pressure data (e.g., pressure at a reference altitude 504) to some other entity (not shown in FIG. 1) such as a server for a weather bureau. The location server 200 may then receive pressure data for weather station 300 from this other entity.

Assume the location coordinates of a mobile station 100 are (x,y), which may be a longitude and a latitude. To determine an altitude of the mobile station 100, the mobile station 100 may send the location server 200 pressure measured at the mobile station 100. This measured pressure may be the actual pressure at the altitude of the mobile station 100. The location server 200 determines the altitude of the mobile station 100 based on a difference between the measured pressure at the mobile station 100 and an estimated pressure at sea level (or some other reference altitude 504) for coordinates (x,y) of the mobile station 100. The estimated pressure at sea level (or some other reference altitude 504) may be computed based on interpolation of pressure measurements from various weather stations 300. The term interpolation is used generically to include interpolation and extrapolation in space and extrapolation in time. If a single weather station 300 is used, pressure at the single weather station 300 may be interpolated (or extrapolated) with time only. That is, multiple pressure points may indicate a raising or lowering pressure trend.

Figure 2:
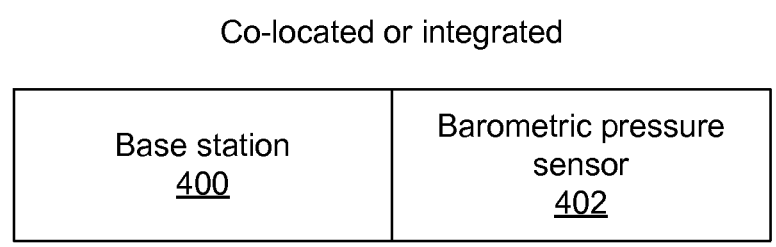
FIG. 2 illustrates that a base station 400 is co-located with a barometric pressure sensor 402, in accordance with some embodiments of the present invention.

FIG. 2 illustrates that a base station 400 is co-located with a barometric pressure sensor 402, in accordance with some embodiments of the present invention. A barometric pressure sensor 402 acts as a means for sensing a pressure. The barometric pressure sensor 402 may be co-located with the base station 400. For example, the barometric pressure sensor 402 may be integrated with the base station 400. Alternatively, the barometric pressure sensor 402 may be located close to the base station 400. For example, the barometric pressure sensor 402 may be located on a tower shared by one or more antennas of the base station 400 or the barometric pressure sensor 402 may be located on the roof of the site housing the base station hardware. In any case, the barometric pressure sensor 402 is linked to the base station 400 for communicating measured pressure to a location server 200. Conveniently, if co-located, the barometric pressure sensor 402 may share a communication link to a location server, the physical site and power. In the following text, a barometric pressure sensor 402 may be referred to as a base station 400 or a base station/barometric pressure sensor.

A base station 400 may be a fixed base station for one or more wireless technologies, such as GSM, W-CDMA, LTE and/or cdma2000. The base station 400 may be a home base station, also referred to as a femtocell, for one or more of these same wireless technologies. Whereas a fixed base station may be installed by a network operator in accordance with some radio plan and have a known location, a home base station may be installed by a wireless network user and have a location that may need to be measured (e.g., using GPS) by the home base station or provided (e.g., in the form of a civic postal address) by the user to the network operator.

Figure 3:
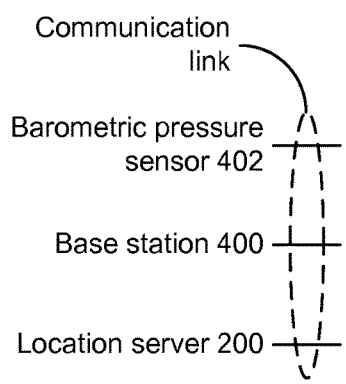
FIGS. 3, 4 and 5 show a communication link and various altitudes, in accordance with some embodiments of the present invention.
Figure 4:
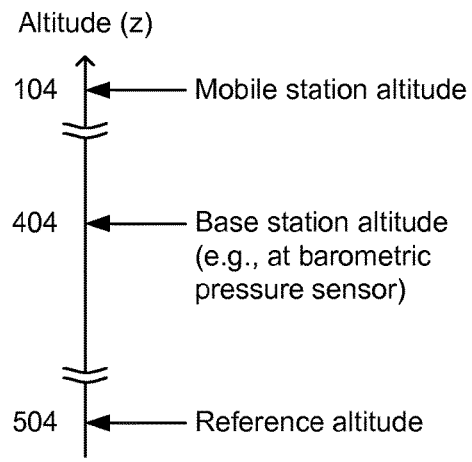
Figure 5:
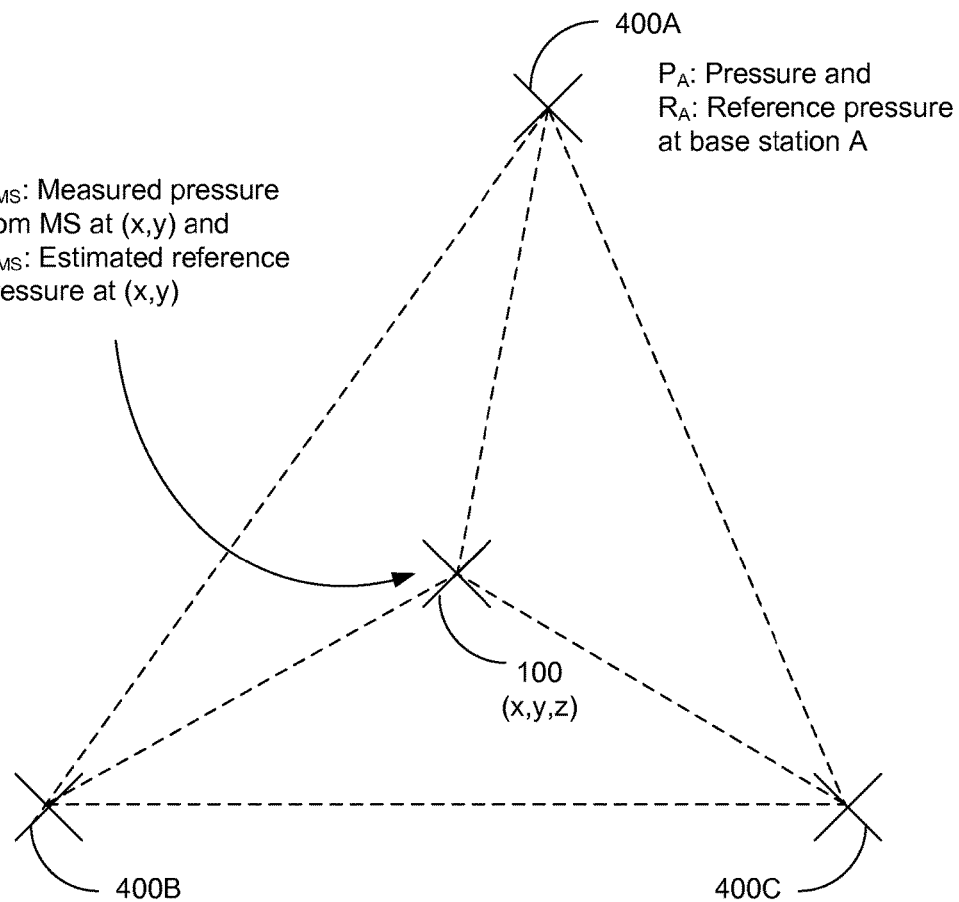

FIGS. 3, 4 and 5 show a communication link and various altitudes, in accordance with some embodiments of the present invention. In FIG. 3, a communication link couples the barometric pressure sensor 402 to a location server 200 via the base station 400. The communication link between the barometric pressure sensor 402 and the base station 400 may be wireless or wired and may use a different communications protocol than the link between the base station 400 and the location server 200. The link between the base station 400 and the location server 200 may use a standard wired or wireless based communications protocol. For example, in the case of an LTE wireless network, a base station 400 may be an evolved Node (eNode B), a location server 200 may be an E-SMLC, and the communications protocol between the base station 400 and the location server 200 may be the LTE Positioning Protocol A (LPPa) defined in 3GPP TS 36.455. In some embodiments, a logical communications link may exist between the base station 400 and the location server 200 that may comprise multiple physical links (e.g., from a base station 400 to a base station controller (BSC) to a mobile switching center (MSC) and so on to reach a location server 200).

In FIG. 4, various altitudes are shown. First, a base station 400 is assigned an altitude 404 of the barometric pressure sensor 402. The barometric pressure sensor 402 may be at a different altitude and coordinate than the base station 400 but for convenience and short hand, the altitude 404 of the barometric pressure sensor 402 may be referred to as the altitude of the base station 400. The altitude 404 of the barometric pressure sensor 402 may be obtained by direct measurement (e.g., using a GPS receiver at a base station 400, which may be employed by the base station 400 for other purposes (e.g., to synchronize the base station 400 timing to a common GPS time). The altitude 404 of the barometric pressure sensor 402 may also or instead be obtained by a site survey (e.g., the location of the base station 400 may be found using a terrain map from which the altitude at ground level may be obtained after which the altitude 404 of barometric pressure sensor may be obtained by adding (or subtracting) the relative height above ground level (or relative depth below ground level) of barometric pressure sensor 402.

Second, a reference altitude 504 is selected. Often, the reference altitude 504 is sea level. For simplicity, sea level is used in the following text as an example of a reference altitude 504. Third, a mobile station altitude 104 is shown. Often, the three altitudes are different. For example, a base station 400 may be on a roof top and a mobile station 100 may be in a building both at different heights above sea level.

In FIG. 5, three base stations 400A, 400B, 400C and a mobile station 100 are shown. A mobile station altitude 104 of the mobile station 100 may be computed from the steps below using a pressure and location (x,y) of the mobile station 100 and pressures and locations of three base stations 400A, 400B, 400C. The three base stations 400A, 400B, 400C may be determined (e.g., by a location server 200 or by the mobile station 100) as being base stations near to the current location of the mobile station 100. For example, one of the base stations may be a current serving base station for the mobile station 100 and the two other base stations may be base stations near to the serving base station or base stations whose signals can be received by the mobile station 100 (e.g., as reported by the mobile station 100 in messages to the serving base station that may be sent as part of normal network operation or as reported by the mobile station 100 to the location server 200). The three base stations 400A, 400B, 400C may instead be determined as being close to the mobile station 100 (e.g., by the location server 200) via a comparison of the horizontal location of the mobile station 100 with the known horizontal locations of base stations in a network serving the mobile station 100. The three base stations 400A, 400B, 400C may also be chosen so that the mobile station 100 is within a triangle whose vertices are the three base stations 400A, 400B, 400C as in the example in FIG. 5. This particular choice may have a benefit that the reference pressure at the location of the mobile station 100 may be more accurately estimated based on known reference pressures from a more diverse set of directions than would be the case if the mobile station 100 was outside of the above triangle.

In a first step, the pressure at each base station 400A, 400B, 400C is measured as $P_A$, $P_B$ and $P_C$, respectively. The measured pressure $P_A$, $P_B$, $P_C$ may be taken hours to minutes beforehand or just before needed in the third step described below. The measured pressure $P_A$, $P_B$, $P_C$ may be taken simultaneously or at different times. The measured pressure $P_A$, $P_B$, $P_C$ is then converted to a reference pressure $R_A$, $R_B$, $R_C$, respectively, at a reference altitude 504 (e.g., sea level) at the locations of the base stations 400A, 400B, 400C. At this point, a reference pressure $R_A$, $R_B$, $R_C$ is known for each base station 400A, 400B, 400C.

In a second step, a position (x,y) of a mobile station 100 is determined. The position (x,y) of the mobile station 100 may be determined by the mobile station 100 or an element of the network (e.g., a location server). The position (x,y) may be determined, for example, using measurements of radio signals received by the mobile station 100 from one or more GNSS systems (not shown in FIG. 5), the base stations 400A, 400B, 400C and/or from other base stations not shown in FIG. 5. The position (x,y) may also or instead be determined, for example, using measurements of radio signals from the mobile station 100 received by the base stations 400A, 400B, 400C and/or by other base stations not shown in FIG. 5. The measurements referred to above may include measurements of received signal strength, received signal-to-noise ratio, received signal timing, received signal-timing differences, received signal pseudoranges (e.g., for GNSS signals) and/or other received signal characteristics. The signal measurements together with known or calculated locations for base stations 400A, 400B, 400C, other base stations and/or GNSS satellites may be used to determine the position (x,y) of the mobile station 100 either by the mobile station 100 or the location server 200. Any GPS or GNSS measurements made by the mobile station 100 employ a GPS or GNSS unit, respectively, in the mobile station 100, or the like. At this point, a horizontal position of the mobile station 100 is determined but the altitude of the mobile station 100 is either unknown or has a large uncertainty. An altitude with a large uncertainty may arise if the position of the mobile station 100 is obtained using GNSS and mobile station is indoors since GNSS signals may then be weak and may be received from only one direction leading to inaccuracy in computed altitude.

In a third step, a reference pressure $R_{MS}$ for the position (x,y) is estimated based on the measured base station pressures $P_A$, $P_B$ and $P_C$ or equivalently base station reference pressures $R_A$, $R_B$ and $R_C$ and based on known locations of the base stations 400A, 400B, 400C. The reference pressure $R_{MS}$ may be estimated by the mobile station 100 or the network (e.g., location server 200). The reference pressure $R_{MS}$ may be estimated by extrapolation, interpolation, or computing a weighted mean of the reference pressures $R_A$, $R_B$ and $R_C$ at the base station 400A, 400B, 400C having known locations. For example, in the case of a weighted mean, the reference pressure at each base station 400A, 400B, 400C may be weighted by the inverse of the distance between each base station and the (x,y) position of the mobile station 100. At this point, an estimated reference pressure $R_{MS}$ for the position (x,y) has been estimated.

In a fourth step, a pressure $P_{MS}$ is measured at the mobile station 100. The measured pressure $P_{MS}$ may be measured before, during or after steps 1-3. The measured pressure $P_{MS}$ may be from a barometric pressure sensor or the like in the mobile station 100.

In a fifth step, a difference between the measured pressure $P_{MS}$ and the estimated reference pressure $R_{MS}$ is computed and then converted to an estimated altitude of the mobile station 100 referenced to the reference altitude 504. Based on steps one through five above, an altitude of a mobile station 100 is estimated from a pressure measured at the mobile station 100, a location (x,y) of the mobile station 100, a pressure measured at three base stations 400A, 400B, 400C, and known locations of the three base stations 400A, 400B, 400C.

In the description above, an altitude of a mobile station 100 is unknown or uncertain and may be estimated based on: (1) the (x,y) location, altitude and measured pressure of one or more base stations 400 (e.g., two or three base stations 400); and (2) the (x,y) location and measured pressure from the mobile station 100. Extensions of the process described above for FIG. 5 will be apparent to those skilled in the art in which fewer than three base stations or more than three base stations are used to determine the reference pressure $R_{MS}$ at the (x,y) location of the mobile station 100. For example, some number N of base stations 400 each associated with a barometric pressure sensor 402 may be used to determine an altitude for a mobile station 100 where N is greater than or equal to one. In that case, the N base stations may be chosen (e.g., by the location server 200) to be close to the mobile station 100 and, in the case that N exceeds two, may be chosen such that the mobile station 100 is inside an N sided polygon whose vertices are the N base stations. In estimating the reference pressure $R_{MS}$ at the location of the mobile station 100 in the case of N base stations, the mobile station 100 or the location server 200 may perform interpolation, averaging or weighted averaging of the reference pressures obtained for the N base stations (e.g., in a weighted averaging, the weight for the reference pressure at each base station 400 may be the inverse of the distance between the base station 400 and the determined location (x,y) of the mobile station 100).

Generally, an altitude of a first device may be estimated based on: (1) an (x,y) location of one or more second devices; (2) altitude of the one or more second devices; (3) measured pressure from the one or more second devices; (4) the (x,y) location of the first device; and (5) measured pressure at the first device. The first device may be a mobile station 100 (as described above) or may be a base station 400 with unknown or uncertain altitude. The one or more second devices may be base stations 400 (as described above), one or more mobile stations 100, or a combination of one or more base stations 400 and one or more mobile stations 100.

In the next case, the first device is a base station 400 with unknown or uncertain altitude and the second devices are three base stations 400 with known altitudes. The altitude of the first device (base station 400) may be estimated base on an (x,y) location and measured pressure at the first device and the (x,y) location, altitude and measured pressure of the three second devices (in this case also base stations 400).

In yet another case, the first device is a base station 400 with unknown or uncertain altitude and the second devices are three mobile stations 100 with a known location, known altitude and a barometric pressure measurement. The altitude of the first device (base station 400) may be estimated based on an (x,y) location and measured pressure at the first device and the (x,y) location, altitude and measured pressure of the three second devices (in this case mobile stations 100). In each case, the first device and the one or more second devices each include a separate barometric pressure sensor to determine a pressure measurement at the device.

In a further case, the first device is a mobile station 100 with unknown or uncertain altitude and the second devices are also three mobile stations 100 but with a known location, known altitude and a barometric pressure measurement. The altitude of the first device (mobile station 100) may be estimated based on an (x,y) location and measured pressure at the first device (mobile station 100) and the (x,y) location, altitude and measured pressure of the three second devices (in this case mobile stations 100). In each case, the first device and the one or more second devices each include a separate barometric pressure sensor to determine a pressure measurement at the device.

Figure 6:
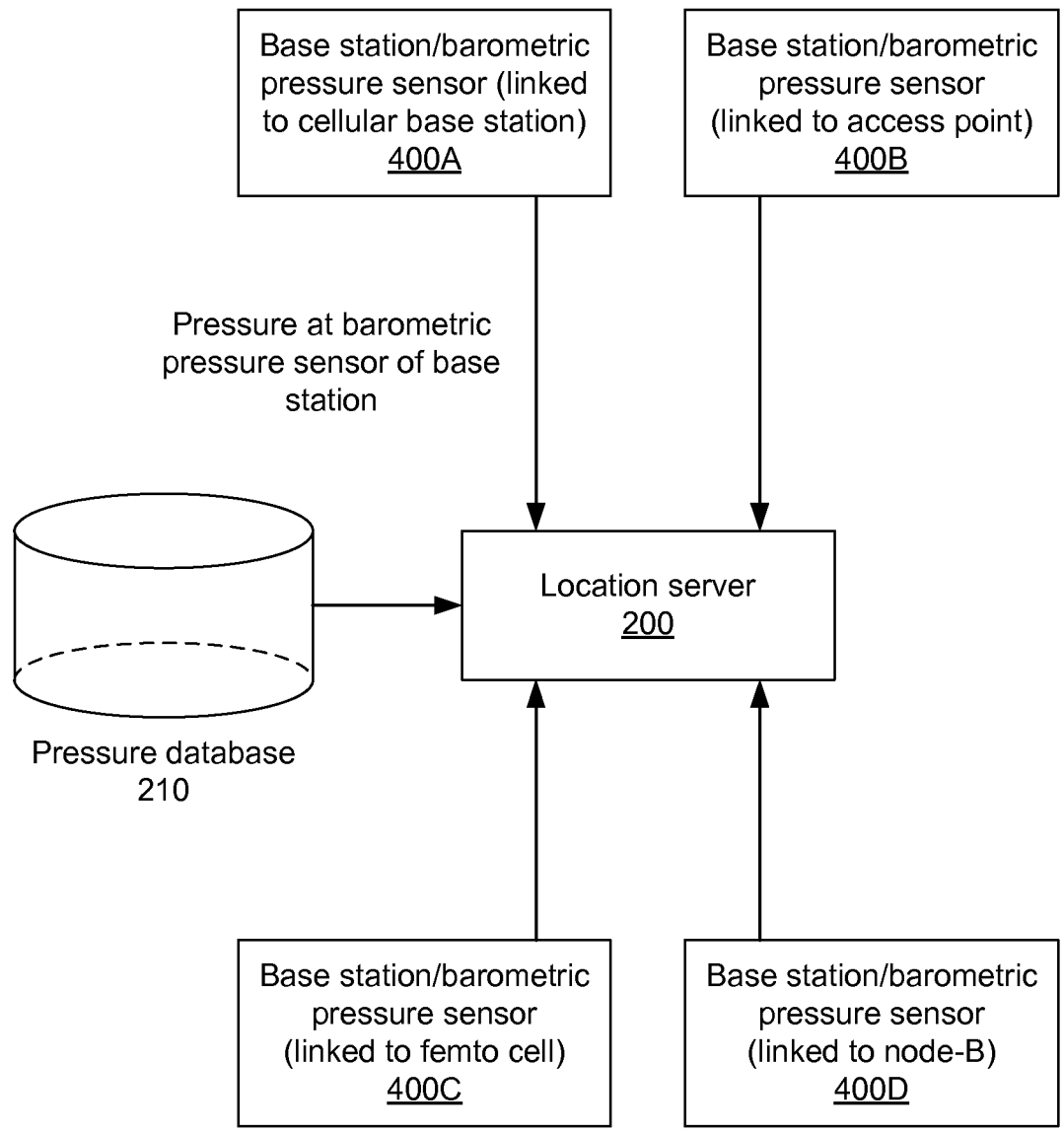
FIG. 6 illustrates a location server linked to various base stations, in accordance with some embodiments of the present invention.

FIG. 6 illustrates a location server 200 linked to various base stations, in accordance with some embodiments of the present invention. The location server 200 usually couples to multiple base stations 400. A base station 400 is a general term for a cellular base station 400A, an access point 400B, a femtocell 400C, a node-B 400D, and the like. The figure denotes a base station/barometric pressure sensor to illustrate that a barometric pressure sensor 402 is linked to a base station 400. The base station 400 sends to the location server 200 a pressure at base station/barometric pressure sensor and, unless already known to location server, coordinates (x,y) and/or altitude (z) of base station/barometric pressure sensor. The location server 200 may also be coupled to a pressure database 210.

In some embodiments, the pressure database 210 may contain information (such as the location of the base station 400 or the barometric pressure sensor 402) not regularly sent to the location server. The pressure database 210 may contain raw pressure measurements recorded at the barometric pressure sensor. The pressure database 210 may contain pressure measurements adjusted for a reference altitude 504 (e.g., sea level). That is, the raw pressure measurements (shown as $P_A$, $P_B$ and $P_C$ in FIG. 5 and taken at coordinates (x,y) and altitude (z) of the barometric pressure sensors) may be adjusted for the same coordinates (x,y) but at a reference altitude 504, such as zero meters above sea level (shown as $R_A$, $R_B$ and $R_C$ in FIG. 5). In these embodiments, the pressure database 210 may be referred to as a reference pressure database. Based on $R_A$, $R_B$ and $R_C$, a reference pressure $R_{MS}$ at (x,y) of the mobile station 100 may be estimated (e.g., by interpolation). From the estimated reference pressure $R_{MS}$ at (x,y) and a barometric pressure sensor measurement $P_{MS}$ at the mobile station 100, an altitude of the mobile station 100 may be computed.

In some embodiments, the pressure database 210 contains a grid point (x,y,z) representing each position of various barometric pressure sensors 402. This grid point (x,y,z) may be the physical location for the barometric pressure sensor 402. Alternatively, this grid point (x,y,z) may be the physical location (x,y) for the base station and the altitude (z) of the barometric pressure sensor 402. In some embodiments, the pressure database 210 associates a timestamp with each recorded pressure value. In some embodiments, the pressure database 210 contains only the most recent pressure measurement from each base station 400 or barometric pressure sensor 402. In other embodiments, the pressure database 210 contains one or more historic pressure values from each base station 400 or barometric pressure sensor 402. In these embodiments, a trend of current and/or future pressure values may be determined from past and/or current pressure values from each base station 400 or barometric pressure sensor 402.

For example, a pressure gradient or gradients may be determined in the form of a first derivative of barometric pressure with respect to time and possibly a second or higher derivatives. In some embodiments, the pressure database 210 may contain only the most recent pressure value from each base station and the latest determined pressure gradients. The latest pressure value and latest pressure gradients may be used in some embodiments (e.g., by a location server 200) to predict the pressure (either reference pressure at a reference altitude or actual pressure at a current altitude) at the location of a barometric pressure sensor at some future time (e.g., at a time when the altitude of some mobile station 100 is to be determined).

In some embodiments, pressure gradients with respect to distance along a horizontal x-axis and/or y-axis may be obtained for different locations (e.g., locations of base stations 400) based on reference pressure measurements from base stations 400 and may also be stored in pressure database 210 (e.g., in order make later computation of a reference pressure at the location of a mobile station 100 more efficient).

Interpolation or extrapolation may be taken into consideration when determining a reference pressure at the location (x,y) of some mobile station 100 in the form of weighting values from a barometric pressure sensor 402 based on: (1) proximately or distance between a base station 400 or a barometric pressure sensor 402 and the mobile station 100; (2) type of terrain (e.g., whether hilly, mountainous, flat, urban, suburban or rural) between a base station 400 or a barometric pressure sensor 402 and the mobile station 100; (3) age or staleness of the pressure measurement; and (4) accuracy of the individual barometric pressure sensors 402. The pressure database 210 may include a timestamp (t) (e.g., determined when recorded, sent or received) and a pressure (p) (e.g., recorded at the barometric pressure sensor 402 or converted into a reference pressure) and an associated location (x,y,z) (e.g., of the barometric pressure sensor 402). The pressure database 210 may comprise one unified database or multiple databases located at the location server 200 and/or other locations accessible to the location server 200. The pressure database 210 may further include temperature and/or humidity measurements obtained by a sensor or sensors collocated with the barometric pressure sensors 402. The temperature and/or humidity measurements may be used to improve the accuracy of reference pressure prediction at the location (x,y) of any mobile station 100 (e.g., by helping predict the type of prevailing weather system and associated spatial and temporal variation of reference pressure). In these embodiments, a mobile station 100 whose altitude is needed may similarly contain a sensor or sensors to measure temperature and/or humidity, which may then be used to help determine the altitude of the mobile station 100.

In some embodiments, each measurement sent to the location server 200 contains the coordinates (x,y) and altitude (z) of the barometric pressure sensor 402. In other embodiments, the coordinates (x,y) and altitude (z) of the barometric pressure sensor 402 are send just once. In still other embodiments, the location server 200 determines from a separate source the location of the base station 400 and/or the barometric pressure sensor 402 (e.g., may determine the location of the base station 400 based on location measurements, such as of GNSS satellites, provided by the base station 400 or may obtain the location from a management system for the base station 400).

The pressure database 210 contains the coordinates (x,y) of the base station/barometric pressure sensor, the altitude (z) of the base station/barometric pressure sensor, and one or more pressure measurements and pressure gradients (e.g., converted from pressure measurements for an actual altitude of the base station/barometric pressure sensor to a pressure at a reference altitude 504 (e.g., sea level) but at the coordinates of the base station/barometric pressure sensor).

Figure 7:
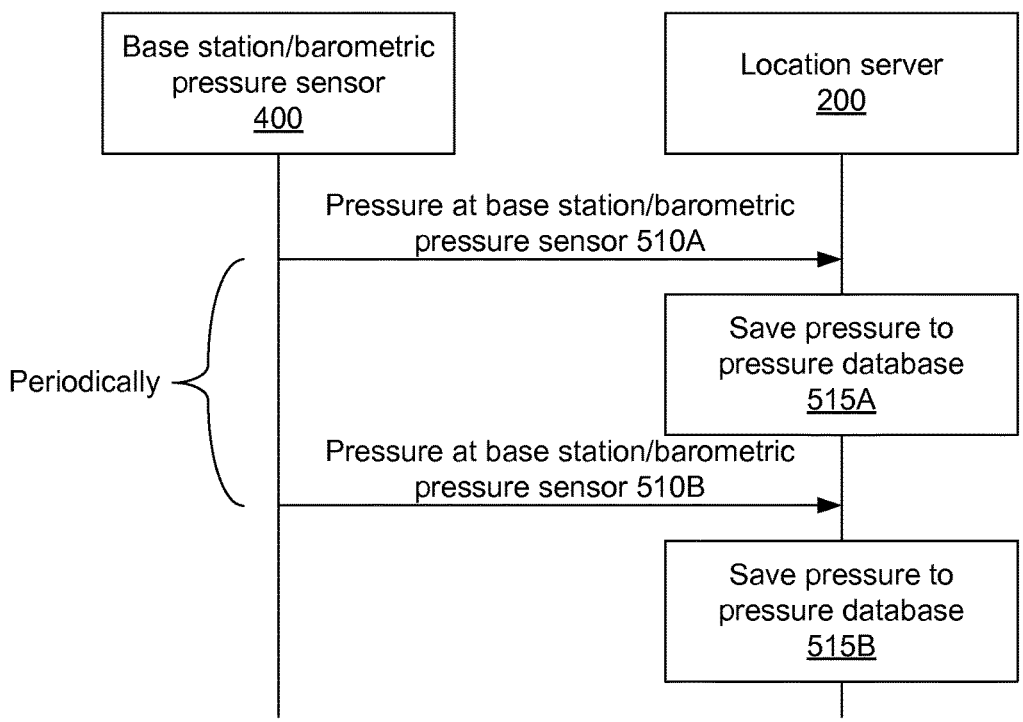
FIGS. 7-8 show signaling between a base station 400 and a location server 200, in accordance with some embodiments of the present invention.
Figure 8:
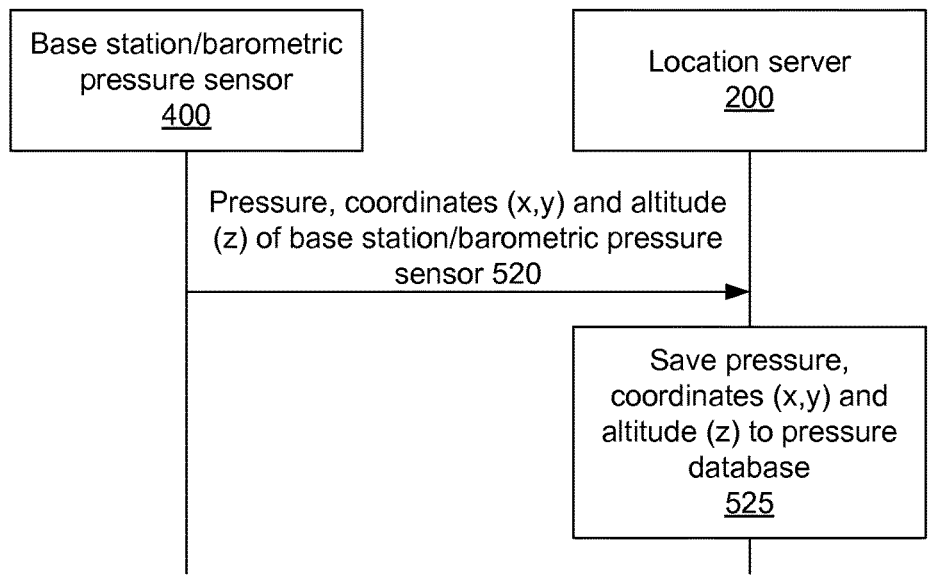

FIGS. 7-8 show signaling between a base station 400 and a location server 200, in accordance with some embodiments of the present invention. In FIG. 7, at 510A, the base station 400 sends a pressure at the barometric pressure sensor 402, and possibly a timestamp, to the location server 200. A transmitter in the base station 400 acts as a means for sending the pressure, coordinates (x,y) (of the base station 400 or barometric pressure sensor 402), an altitude (z) of a barometric pressure sensor, and timestamp (t) (representing a time when the pressure at a barometric pressure sensor 402 was sensed) to the location server 200 for populating the pressure database. A receiver in the location server 200 acts as a means for receiving the pressure, coordinates (x,y), the altitude (z) and timestamp from the base station.

Alternatively, at time of reception, the location server 200 may generate the timestamp. The timestamp may be used later in extrapolation and interpolation from various base stations 400 to an arbitrary point of a mobile station 100. At 515A, the location server 200 saves the received pressure, or a reference pressure based on the received pressure, to a pressure database 210. The timestamp may also be stored with the saved pressure. The process repeats periodically, at 510B, where the base station 400 sends another pressure at the barometric pressure sensor to the location server 200. Again, at 515B, the location server 200 saves the received pressure to the pressure database 210.

In FIG. 8, the coordinates (x,y) and altitude (z) of the base station are unknown to the location server 200. At 520, the base station 400 sends the coordinates (x,y) and altitude (z) of the barometric pressure sensor 402 to the location server 200. In the same or different message, the base station 400 sends the pressure of the barometric pressure sensor 402 to the location server 200. At 525, the location server 200 saves the coordinates (x,y) and altitude (z) of the barometric pressure sensor 402 to a pressure database 210. At the same or different time, the location server 200 saves the pressure of the barometric pressure sensor 402 to the pressure database 210. In some embodiments, the signaling at events 510A and 510B in FIG. 7 and/or at event 520 in FIG. 8 may use the LPPa protocol.

Figure 9:
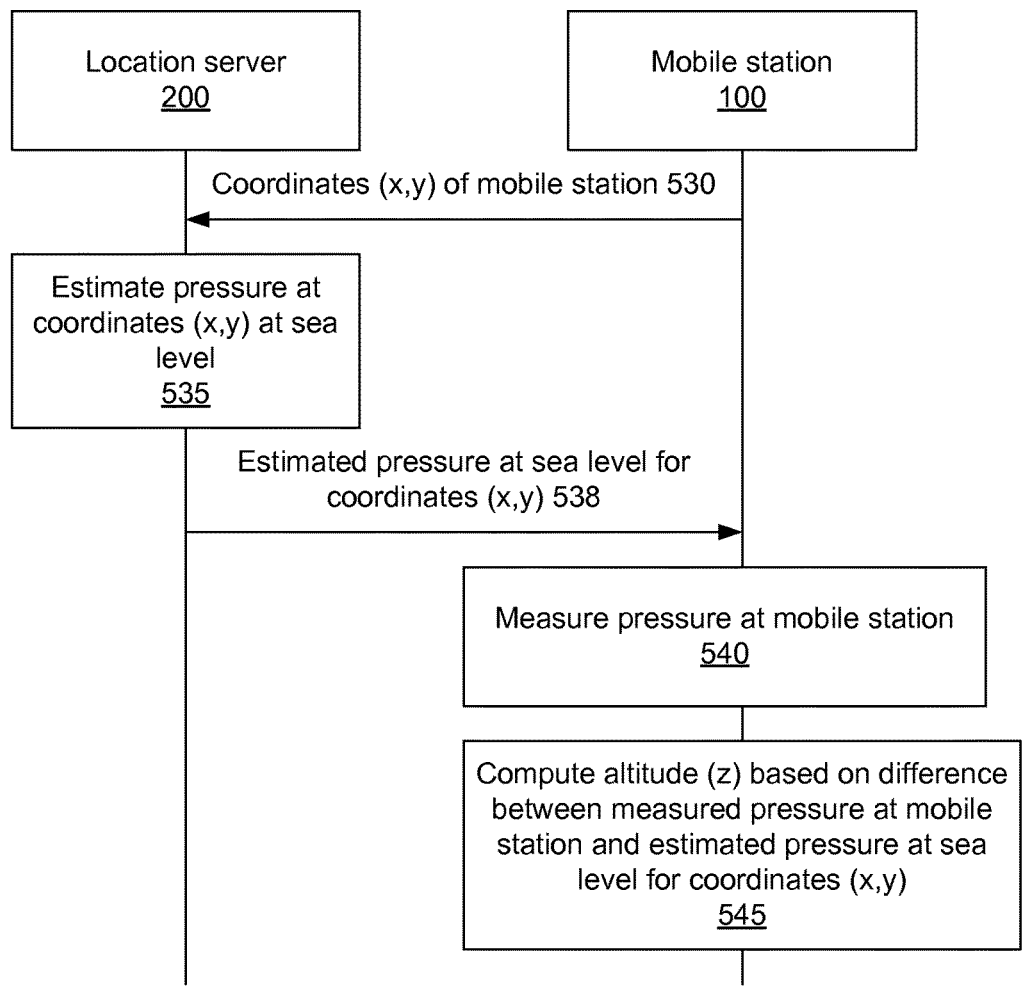
FIGS. 9-11 show signaling between a location server 200 and a mobile station 100, in accordance with some embodiments of the present invention.
Figure 10:
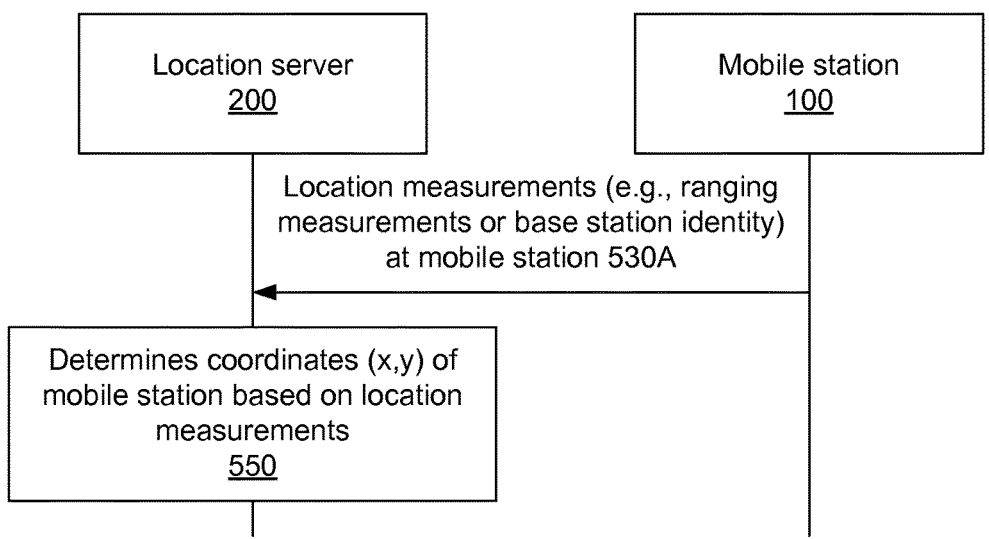
Figure 11:
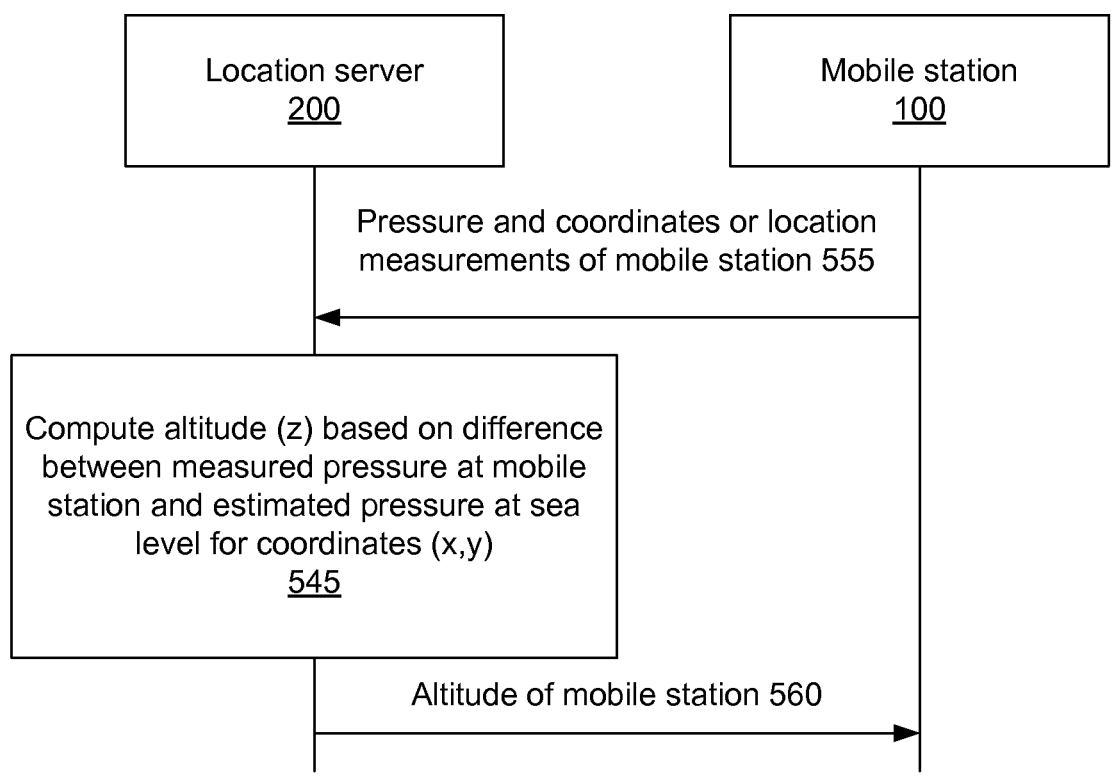

FIGS. 9-11 show signaling between a location server 200 and the mobile station 100, in accordance with some embodiments of the present invention. At 530, the mobile station 100 captures and sends to the location server 200 coordinates (x,y) of the mobile station 100. At 535, the location server 200 estimates a sea level pressure at the coordinates (x,y) of the mobile station 100 by interpolating sea level pressures of base stations 400 around or nearby the coordinates (x,y) of the mobile station 100. At 538, the location server 200 sends the mobile station 100 the estimated pressure at sea level for coordinates (x,y). At 540, the mobile station 100 measures the pressure at the mobile station 100. Step 540 may occur before, during or after the location server estimation of the sea level pressure. Most effectively if weather conditions are changing, step 540 (mobile pressure measurement) occurs at approximately the same time or close in time to when the barometric pressure sensor 402 captures its pressure. At 545, the mobile station 100 computes an altitude (z) of the mobile station 100 based on a difference between: (1) the measured pressure at the mobile station 100; and (2) the estimated pressure at sea level for coordinates (x,y) of the mobile station received from the location server 200.

In FIG. 10, the mobile station 100 sends location measurements rather than coordinates (x,y). At 530A, the mobile station 100 sends, to the location server 200, location measurements, such as GNSS measurements, ranging measurements and/or a base station identity (e.g., an access point identifier (ID), cell ID, etc.), received at the mobile station 100. At 550, the location server 200 determines coordinates (x,y) of the mobile station 100 based on the location measurements. Methods are known to locate a mobile station 100 based on location measurements. Steps 535, 538, 540 and 545 may then occur (not shown in FIG. 10) as described for FIG. 9 to enable the mobile station 100 to determine its altitude.

In FIG. 11, the location server 200 rather than the mobile station 100 computes an altitude of the mobile station 100. At 555, the mobile station 100 sends the location server 200 a pressure measured by the mobile station 100. The mobile station 100 also sends either coordinates (x,y) of the mobile station 100 or location measurements measured at the mobile station 100. At 545, the location server 200 computes the altitude (z) of the mobile station 100 based on a difference between the measured pressure at the mobile station 100 and the estimated pressure at sea level for coordinates (x,y) of the mobile station 100. At 560, the location server 200 sends the mobile station 100 the computed altitude of the mobile station 100. In some embodiments, the signaling protocol used to transfer location and pressure related information between the location server 200 and the mobile station 100 (steps 530 and 538 in FIG. 9; step 530A in FIG. 10; and/or steps 555 and 560 in FIG. 11) may be the LTE Positioning Protocol (LPP) defined by 3GPP in 3GPP TS 36.355 or may be the LPP protocol combined with the LPP Extensions (LPPe) protocol that is publicly defined by OMA.

Figure 12:
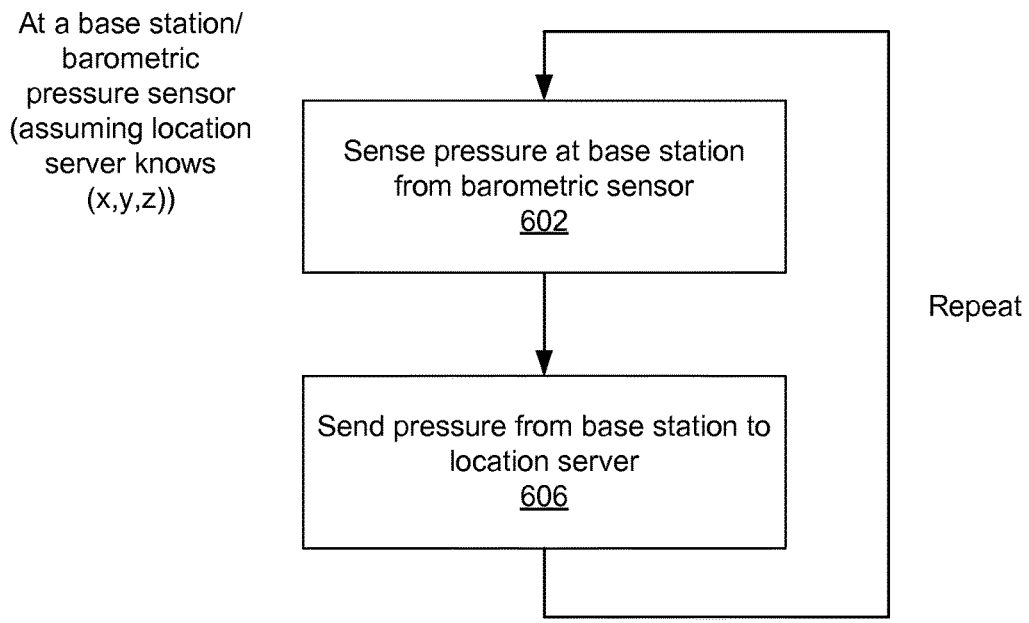
FIGS. 12-13 illustrate methods in a base station, in accordance with some embodiments of the present invention.
Figure 13:
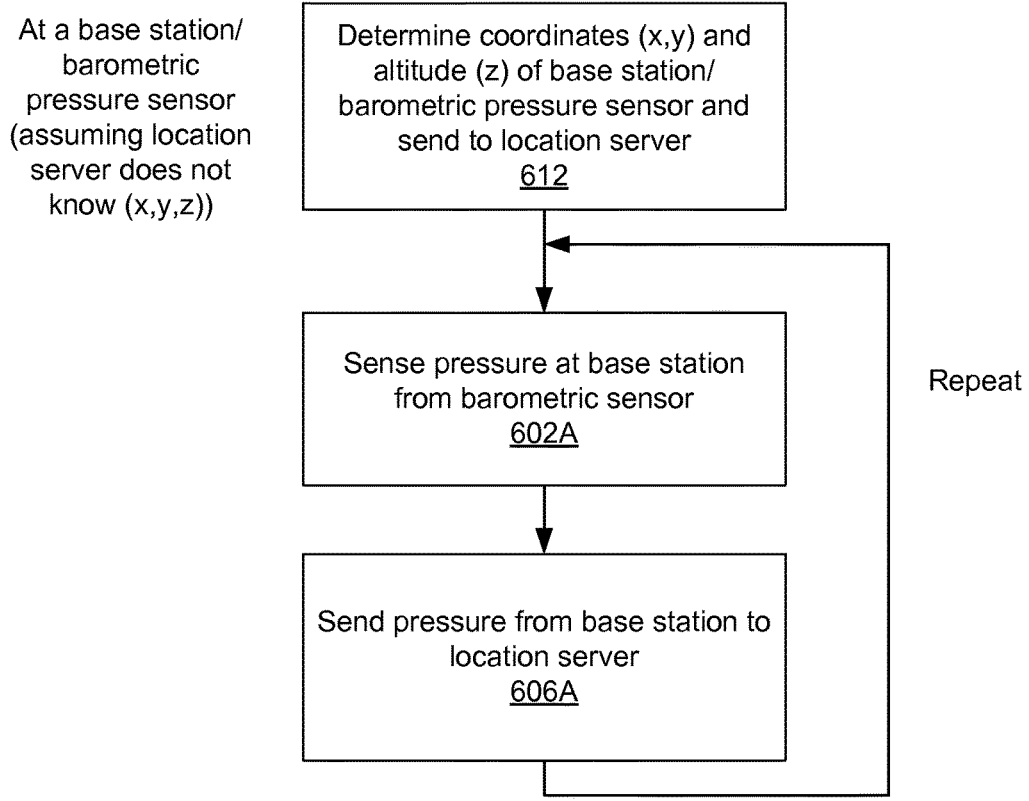

FIGS. 12-13 illustrate methods in a base station, in accordance with some embodiments of the present invention. In FIG. 12, a location server 200 is assumed to know the location of the barometric pressure sensor 402. The location of the barometric pressure sensor 402 may be an absolute location (x,y,z), such as longitude, latitude and altitude. Equivalently, the location server 200 may know the location (x,y,z) of the base station 400 and a relative displacement ($\Delta x, \Delta y, \Delta z$) from the base station 400 to the barometric pressure sensor 402. Alternatively, coordinates (x,y) of the base station 400 are used to approximate the coordinates (x,y) of the barometric pressure sensor 402 and the altitude (z) is determined accurately by the actual altitude of the barometric pressure sensor 402 (e.g., the altitude (z) of the base station 400 adjusted by the relative vertical displacement (Δz) from the base station 400 to the barometric pressure sensor 402). As mentioned earlier, the position of the barometric pressure sensor 402 may be referred to as the position or location of the base station 400 for short hand. More precisely though, the position of the barometric pressure sensor 402 should not be approximated by the position (x,y) or (x,y,z) of the base station 400. Alternatively, the position of the barometric pressure sensor 402 may be roughly approximated by the position of the base station 400, especially when the barometric pressure sensor 402 and the base station 400 are positioned at the same or almost the same altitude.

The position of the barometric pressure sensor 402 may be determined by a site survey (accurately measuring or approximating the relative displacement (Δx,Δy,Δz) from the base station 400. Alternatively, the position of the barometric pressure sensor 402 may be determined by crowd sourcing. For example, a nearby mobile station 100 (e.g., being serviced by the base station 400 linked to the barometric pressure sensor 402) may determine its own position (e.g., using GPS) including both an altitude and a pressure at the mobile station 100. Next, the mobile station 100 reports to the location server 200 its position including both its altitude (e.g., from GPS) and pressure (e.g., from a local pressure sensor) at the mobile station 100.

The mobile station 100 may also report other measurements to the location server 200, such as an identity for the base station 400, a signal strength received from the base station 400 and/or a signal propagation time to the base station 400, that may enable the location server 200 to estimate a horizontal location or set of possible horizontal locations for the base station 400 relative to the mobile station 100. The base station 400 may also provide measurements to a location server 200 for the mobile station 100, which may be requested by the location server 200 at the same time or almost the same time as measurement information is provided to the location server 200 by the mobile station 100 for the base station 400. The measurements provided by the base station 400 may include the signal strength received from the mobile station 100, the signal-to-noise ratio received from the mobile station 100 and/or the signal propagation time to the mobile station 100.

Several such nearby mobile stations 100, at the same time or at other times, similarly may determine and report their respective positions including both altitudes and pressures and possibly additional measurements related to a relative horizontal location for the base station 400. The location server 200 may similarly request and obtain measurements from the base station 400 for each of the other nearby mobile stations 100.

With each reported position of a mobile station 100, a location server 200 may determine a possible horizontal location or a possible set of horizontal locations for the base station 400. For example, if each mobile station 100 reports a signal strength from a base station 400 or a signal propagation time from a base station 400, or if the base station 400 reports a signal strength from each mobile station 100 or a signal propagation time from each mobile station 100, the location server 200 may be able to determine an approximate distance between each mobile station 100 and base station 400. Using the reported (x,y) location of a mobile station 100, the location server 200 may be able to determine that the location of the base station 400 is on a circle with center given by a known location of the mobile station 100 and radius given by the distance between the mobile station 100 and the base station 400. If similar information is determined by the location server 200 for other mobile stations 100, the location server 200 may determine the horizontal location of the base station 400 from the intersection of the different circles. Since measurement errors may mean that the circles do not all intersect at one unique point, the location server 200 may combine the different intersection points of the circles via averaging or weighted averaging to obtain a single horizontal location for the base station 400.

In order to determine the altitude of barometric pressure sensor 402 at the base station 400, the location server 200 may pair the reported altitude of and pressure at each mobile station 100 with a sensed pressure reading from the barometric pressure sensor 402. The location server 200 may then determine a vertical displacement between the mobile station 100 and the barometric pressure sensor 402 from the difference in pressures. The vertical displacement from difference in pressures may then be applied to the altitude of the mobile station 100 to determine the altitude of the barometric pressure sensor 402. In some cases, the quality of the pressure sensor on the mobile station 100 may be lower than the quality of the pressure sensor at the barometric pressure sensor 402 (e.g., by one or two orders of accuracy). With crowd sourcing in these cases, inaccuracies of the pressure sensors at the various mobile stations 100 may be averaged out to result in an accuracy comparable to the accuracy of the barometric pressure sensor 402.

Again in FIG. 12, at 602, the barometric pressure sensor 402 senses pressure at the barometric pressure sensor 402. In turn, the base station 400 receives a pressure value representing the pressure at the barometric pressure sensor 402. At 606, the base station 400 relays or sends the pressure originating from the barometric pressure sensor 402 to the location server 200. Conveniently, the link between the base station 400 and the location server 200 is an already known and established link.

In FIG. 13, the location server 200 is assumed not to know a priori the position of the barometric pressure sensor 402. The position of the barometric pressure sensor 402 may be signaled from the base station 400 to the location server 200 as shown in 612. At 612, the base station 400 determines coordinates (x,y) and altitude (z) of the barometric pressure sensor 402. For example, the relative vertical displacement (Δz) is set as a parameter in the base station 400. Alternatively, one of the several methods described above, such as crowd sourcing of measurements from mobile stations 100 and possibly from the base station 400 at the location server 200, is used. The base station 400 signals or sends the relative vertical displacement (Δz) and the (x,y) coordinates of the base station or the absolute position (x,y,z) of the barometric pressure sensor 402 or an approximation of the position of the barometric pressure sensor 402 or other measurements to be used in association with crowdsourcing to the location server 200. The method continues to steps 602A and 606A described above with respect to steps 602 and 606, respectively. The method repeats between 602A and 606A, thereby avoiding a need to resend the position (x,y,z) of the barometric pressure sensor 402.

Figure 14:
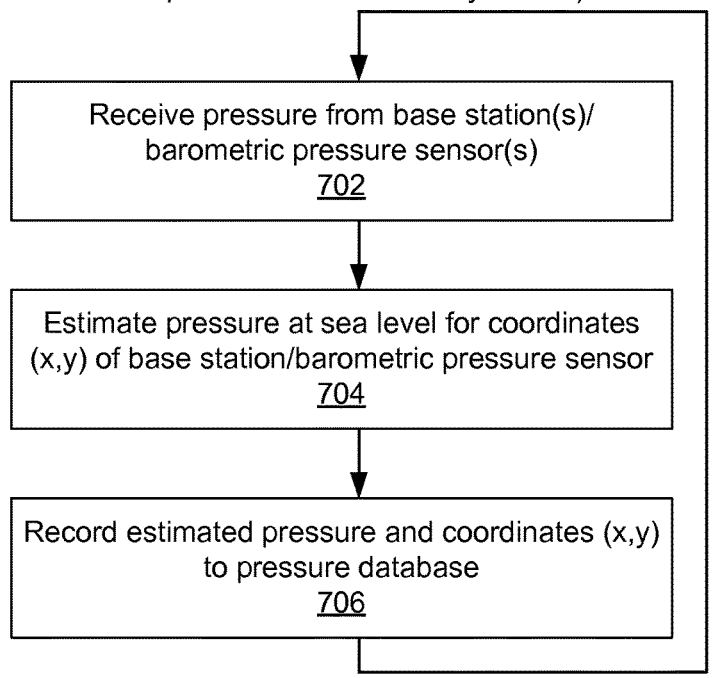
FIGS. 14-16 illustrate methods at a location server, in accordance with some embodiments of the present invention.
Figure 15:
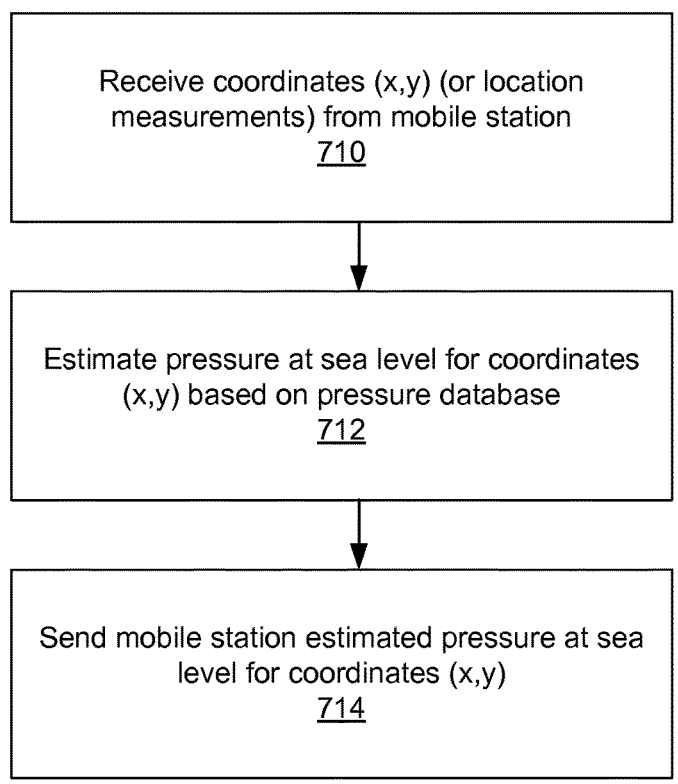
Figure 16:
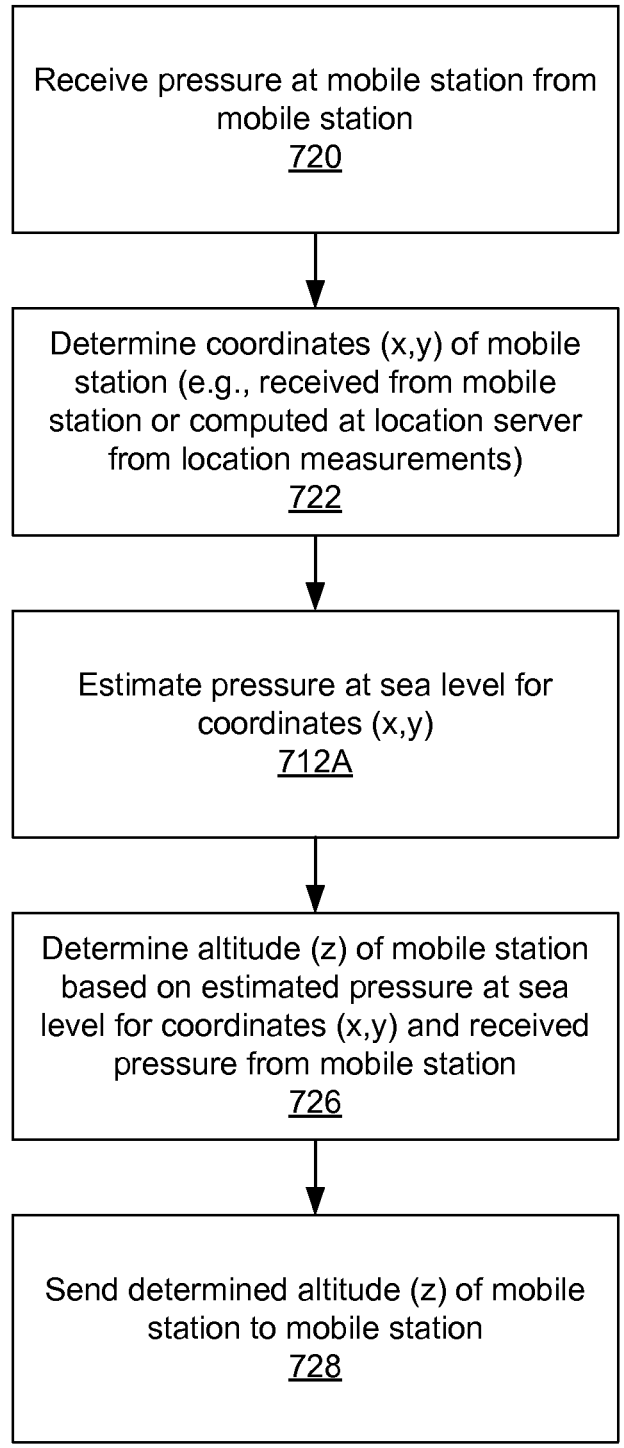

FIGS. 14-16 illustrate methods at a location server 200, in accordance with some embodiments of the present invention. In FIG. 14, a location server 200 communicates with a base station 400. The position of the barometric pressure sensor 402 is assumed already known, estimated (e.g., by crowd sourcing), or approximated (e.g., by assuming the coordinates (x,y) of the base station 400 but including the relative vertical displacement (Δz) from the base station 400 to the barometric pressure sensor 402). In some embodiments, the vertical displacement (Δz) or absolute vertical position (z) may be approximated while in other embodiments, the position of the barometric pressure sensor may be determined with high precision (e.g., using surveying, etc.). Accurate positioning of the barometric pressure sensor 402, especially the altitude component, may be used for providing one-meter resolution of the location of the mobile station 100.

At 702, the location server 200 receives a pressure value from at least one base station 400 having a barometric pressure sensor 402. In some embodiments, a timestamp is generated at the base station 400 or the barometric pressure sensor 402 and sent with the pressure value. In some embodiments, a timestamp is generated at the location server 200 and associated with the pressure value. At 704, the location server 200 estimates a pressure at sea level (or other reference altitude 504) for the coordinates (x,y) of the barometric pressure sensor 402 (e.g., using a barometric formula). The coordinates (x,y) of the barometric pressure sensor 402 may be retrieved from a pressure database 210 or received from the base station 400. At 706, the location server 200 records the estimated pressure at sea level for coordinates (x,y) to the pressure database. The process repeats with each new pressure measurement received. The estimated pressure at sea level may be an input to a barometric formula or to a filter (e.g., computing an average, a weighted average, or a low pass filtered value) with the output provided to a requesting mobile station 100 and/or stored in the pressure database 210 as the pressure at sea level for the coordinates (x,y) of the barometric pressure sensor 402 or the base station 400. The process repeats starting again at step 702. In some embodiments, pressure values may be stored in association with an identity for the barometric pressure sensor 402 or the base station 400 rather than in association with (x,y) coordinates for the base station 400 in which case, the (x,y) coordinates (or (x,y,z) coordinates) for the barometric pressure sensor 402 or the base station 400 may be retrieved by the location server 200 at a later time (e.g., when a stored pressure value is retrieved in order to compute the altitude of a mobile station 100).

The location server 200 builds up it pressure database 210 or library by communicating with one or more base stations 400 and storing received pressure measurements or the adjusted reference pressure (e.g., sea level pressure) for the coordinates (x,y) of the base station 400 (or barometric pressure sensor 402). In some embodiments, the received pressure value is stored in the pressure database 210 with a timestamp. After the pressure database 210 is populated with sea level pressures derived from measured pressures at the barometric pressure sensors 402 from several base stations 400, the pressure database 210 may be used to interpolate a pressure at an altitude between or among the several base stations 400. For example, a location server 200 or the like may determine an altitude from a pressure from an arbitrary point nearby or among the several base stations 400.

In some embodiments, the location server 200 determines the reference pressure (e.g., at sea level) for any arbitrary coordinate (x,y) based on the pressure database 210, which may contain the reference pressure from each location of the barometric pressure sensor 402 or the base station 400. Therefore, the location server 200 may determine the reference pressure at any arbitrary point through interpolation and/or extrapolation, not just at a position of a particular base station 400. Therefore, an altitude may be determined for a mobile station 100. The methods described herein may be used to determine an altitude of a mobile station 100, as described. Alternatively, methods may determine the altitude of another unit, such as newly installed barometric pressure sensor 402, having an unknown altitude using a pressure measurement from newly the installed barometric pressure sensor 402 and (x,y) coordinates for the barometric pressure sensor 402, which may be already known (e.g., from a site survey), measured (e.g., using GPS), or obtained using crowdsourcing.

In FIG. 15, a location server 200 communicates with a mobile station 100. At 710, a location server 200 receives coordinates (x,y) from a mobile station 100. Equivalently, the location server 200 receives location measurements from a mobile station 100 then determines the coordinates (x,y) for the mobile station 100 from the location measurements. At 712, the location server 200 estimates the pressure at sea level for coordinates (x,y) of the mobile station 100 based on its pressure database 210. At 714, the location server 200 sends the mobile station 100 the estimated pressure at sea level for its coordinates (x,y). The mobile station 100 may use this pressure to compute its altitude.

In FIG. 16, a location server 200 determines the altitude of a mobile station 100 rather than just providing a reference pressure to the mobile station 100, as described above. At 720, the location server 200 receives a pressure from a mobile station 100 measured at the mobile station 100. At 722, the location server 200 determines the coordinates (x,y) of mobile station (e.g., directly received from the mobile station 100 or by computing at the location server 200 from location measurements received from the mobile station 100). At 712A, the location server 200 estimates pressure at sea level for coordinates (x,y), as described above at step 712 in FIG. 15. At 726, the location server 200 determines an altitude (z) of the mobile station 100 based on an estimated pressure at sea level (or other reference altitude 504) for coordinates (x,y) of the mobile station 100 and the pressure measurement received from the mobile station 100. At 728, the location server 200 sends the determined altitude (z) of the mobile station 100 back to the mobile station 100.

Figure 17:
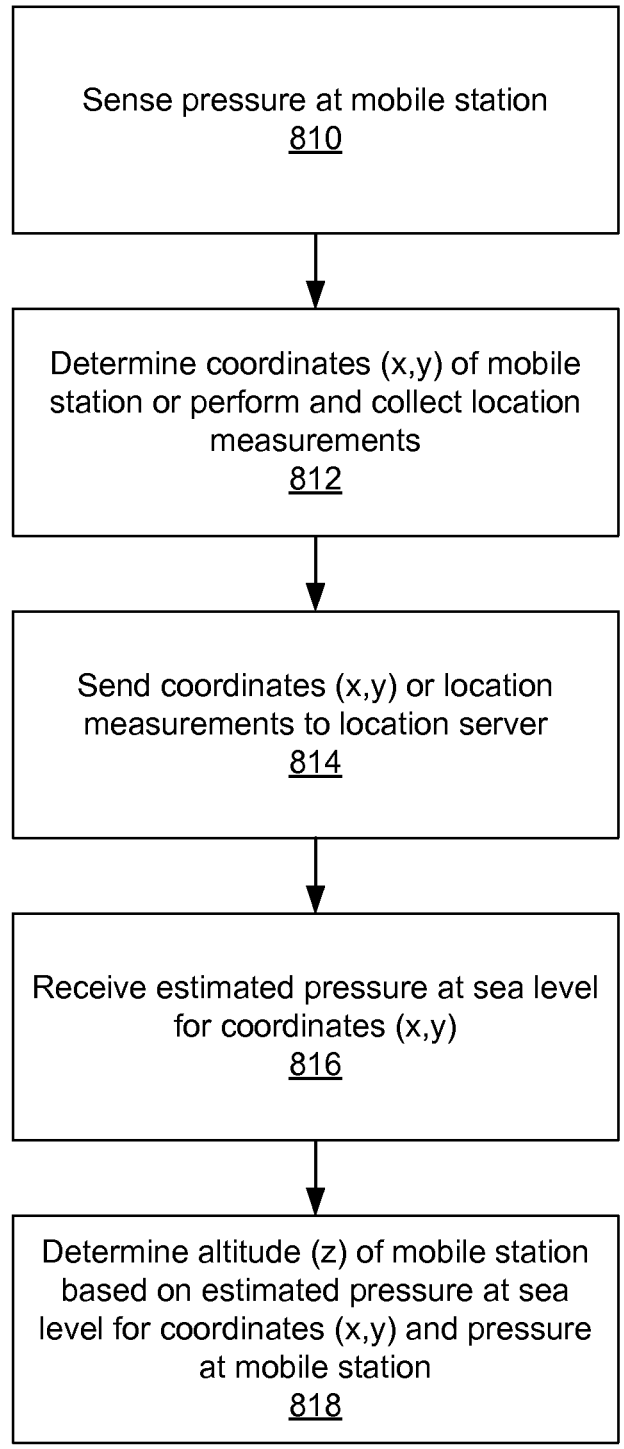
FIGS. 17-18 illustrate methods at a mobile station, in accordance with some embodiments of the present invention.
Figure 18:
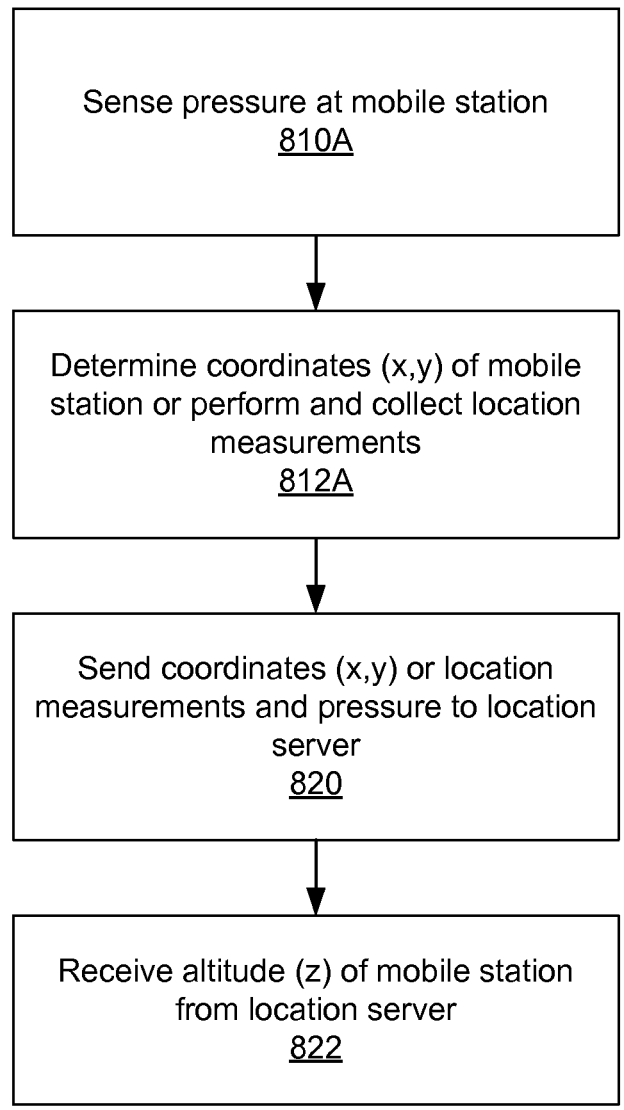

FIGS. 17-18 illustrate methods at a mobile station, in accordance with some embodiments of the present invention. In FIG. 17, a mobile station 100 determines its own altitude based on pressure measurements it performs and reference pressure at sea level received from a location server 200. At 810, the mobile station 100 senses a pressure at the mobile station 100. At 812, the mobile station 100 determines it coordinates (x,y). Alternatively, the mobile station 100 performs and collects location measurements for the location server 200 to determine the coordinates (x,y) of the mobile station 100. At 814, the mobile station 100 sends the coordinates (x,y) of the mobile station 100, or location measurements collected by the mobile station 100, to the location server 200. At 816, the mobile station 100 receives an estimated pressure at sea level for coordinates (x,y) of the mobile station 100. Finally, at 818, the mobile station 100 determines an altitude (z) of the mobile station 100 based on estimated pressure at sea level for coordinates (x,y) and the pressure at the mobile station 100.

In FIG. 18, a mobile station 100 sends the measured pressure to a location server 200 including its coordinates (x,y) or location measurements which enable the location server 200 to determine the mobile station 100 coordinates (x,y), which computes and returns an altitude. At 810A and 812A, the process begins as described with reference to steps 810 and 812, respectively, described above for FIG. 17.

At 820, the mobile station 100 sends coordinates (x,y) (or location measurements) and the measured pressure to the location server 200. At 822, the mobile station 100 receives an altitude (z) of the mobile station 100 from the location server 200.

In certain embodiments, the location server 200 may send measured or estimated reference pressure information to the mobile station 100 for the current location of the mobile station 100 and/or for other locations nearby to the mobile station 100. The reference pressure information may include pressure gradient information (e.g., the first and possibly higher derivatives of reference pressure with respect to time or with respect to distance along a horizontal x-axis or y-axis) and/or may include duration or date plus a time indication. The pressure information sent to the mobile station 100 by the location server 200 may be derived from a pressure database 210 or a subset of pressure database 210. The pressure information sent to the mobile station 100 may enable the mobile station 100 to determine its altitude at future times (e.g., after the mobile station 100 has moved to a new location) without needing to query the location server 200 for an altitude or new pressure information. If the location server 200 includes a duration (or date and time indication) with any pressure information sent to the mobile station 100, the mobile station 100 may consider the pressure information as being valid during this duration (or up until the indicated date and time). After the duration has elapsed (or the indicated date and time has been reached), the mobile station 100 might no longer consider the received pressure information as valid and may query the location server 200 at a later time (e.g., as described in FIG. 17 and FIG. 18) the next time the mobile station 100 needs to determine its altitude.

In some embodiments, an allowance may be made for a difference in air pressure between an indoor and an outdoor environment. Such a pressure difference may arise due to use of cooling, heating and/or ventilation systems (e.g., which employ forced air circulation) in an indoor environment that in some cases may increase air pressure indoors compared to outdoors at the same altitude. An operator of base stations 400 may know whether the associated barometric pressure sensors 402 are located indoors or outdoors. A mobile station 100 or a location server 200 may also be able to determine whether a mobile station 100 is indoors or outdoors. For example, a mobile station 100 may be determined to be indoors if: (i) signal strengths received from GNSS satellites are all much lower than nominal values received in an outdoor clear sky environment; (ii) the mobile station 100 is able to receive strong signals from at least several base stations 400 (e.g., WiFi access points or femtocells) that are known to be located indoors; (iii) the mobile station 100 is not able to receive strong signals from any base station 400 known to be located outdoors; (iv) inertial sensors (e.g., accelerometers or a barometer) on the mobile station 100 indicate a rapid change in altitude over a short period of time consistent with the user of the mobile station 100 moving in an elevator or escalator; and/or (v) a barometer in the mobile station 100 measures a sudden increase in pressure over a short period of time (e.g., 1 or 2 seconds) consistent with the user of the mobile station 100 having just entered a building that has a higher air pressure compared to outdoors. In determining whether the mobile station 100 is indoors, several or all of these conditions may be used rather than just one condition. For example, a mobile station 100 may be determined to be indoors if at least two of the conditions (i) to (v) are verified to be true and none of the other conditions are verified to be false. Conditions opposite to conditions (i) to (v) (for determining that a mobile station 100 is indoors) may be used to determine that a mobile station 100 is outdoors. Assuming that a mobile station 100 or a location server 200 can determine that a mobile station 100 is outdoors, the location server 200 may restrict estimation of the reference pressure for the location of the mobile station 100 just to pressure measurements received from base stations 400 that are known to be outdoors. This may avoid errors that might otherwise be introduced had the location server 200 also made use of pressure measurements from an indoor base stations 400. Similarly, if a mobile station 100 is determined to be indoors, a location server 200 may use the horizontal (x,y) position of the mobile station 100 (or other information from a mobile station 100 such as the identities of base stations 400 that can be received by the mobile station 100) to determine a particular building or indoor venue in which mobile station 100 is located. A location server 200 may then use pressure measurements from a base station 400 known to be in the same building or indoor venue as the mobile station 100 in order to reliably determine the altitude of the mobile station 100. In some situations, there may not be any base stations 400 in the same building or indoor venue as the mobile station 100 from which the location server 200 is able to receive pressure measurements. In that case, if a mobile station 100 is able to measure the pressure difference between its current indoor environment and outdoors (e.g., by measuring and recording the pressure difference when the mobile station 100 enters the indoor environment), the location server 200 or the mobile station 100 may subtract this pressure difference from any pressure measurement made by the mobile station 100 while indoors in order to obtain the equivalent outdoor air pressure at the same altitude as the mobile station 100. The altitude of the mobile station 100 may then be determined using this equivalent outdoor air pressure combined with pressure measurements from base stations 400 that are known to be outdoors.

The location server 200 may further obtain and store an indoor-outdoor pressure difference for different buildings and indoor venues by crowdsourcing pressure difference values measured by various mobile stations 100 as each mobile station 100 enters or exits from a building or indoor venue. These stored pressure differences may then be used to determine the altitude of a mobile station 100 that is in a building or indoor venue without the need for the mobile station 100 to measure and provide an indoor-outdoor pressure difference. Since the indoor-outdoor pressure difference may vary with time (e.g., may increase when forced air circulation is switched on or decrease when air circulation is reduced or switched off, such as between work and non-working hours), the location server 200 may need to continuously track the indoor-outdoor pressure difference via continuous crowd sourcing and/or may determine repeated patterns of pressure difference (such as daytime versus nighttime) that may be used to predict pressure difference when recent crowd-sourced information is not available.

Figure 19:
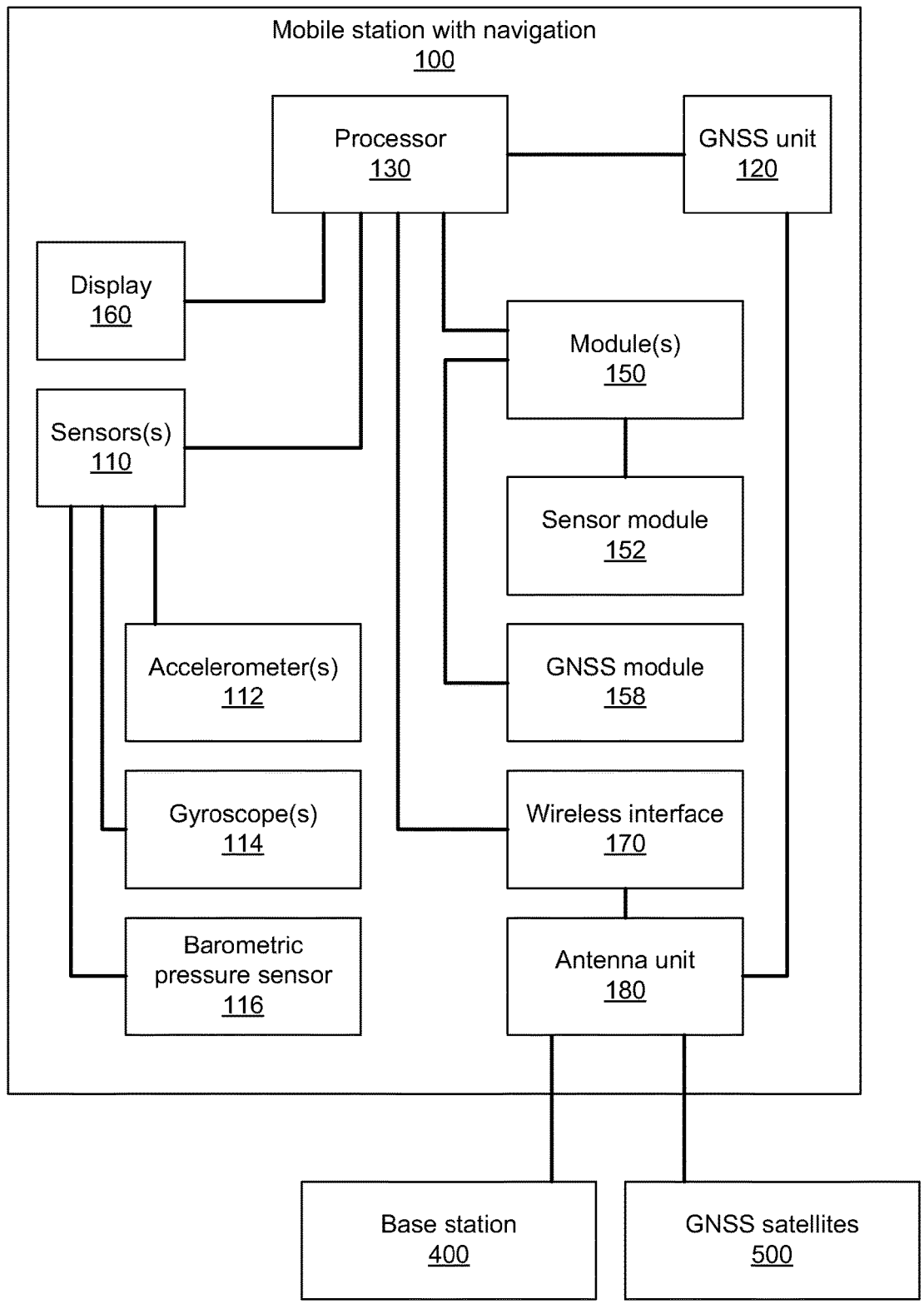
FIGS. 19-21 show block diagrams of a mobile station, a base station and a location server, respectively, in accordance with some embodiments of the present invention.
Figure 20:
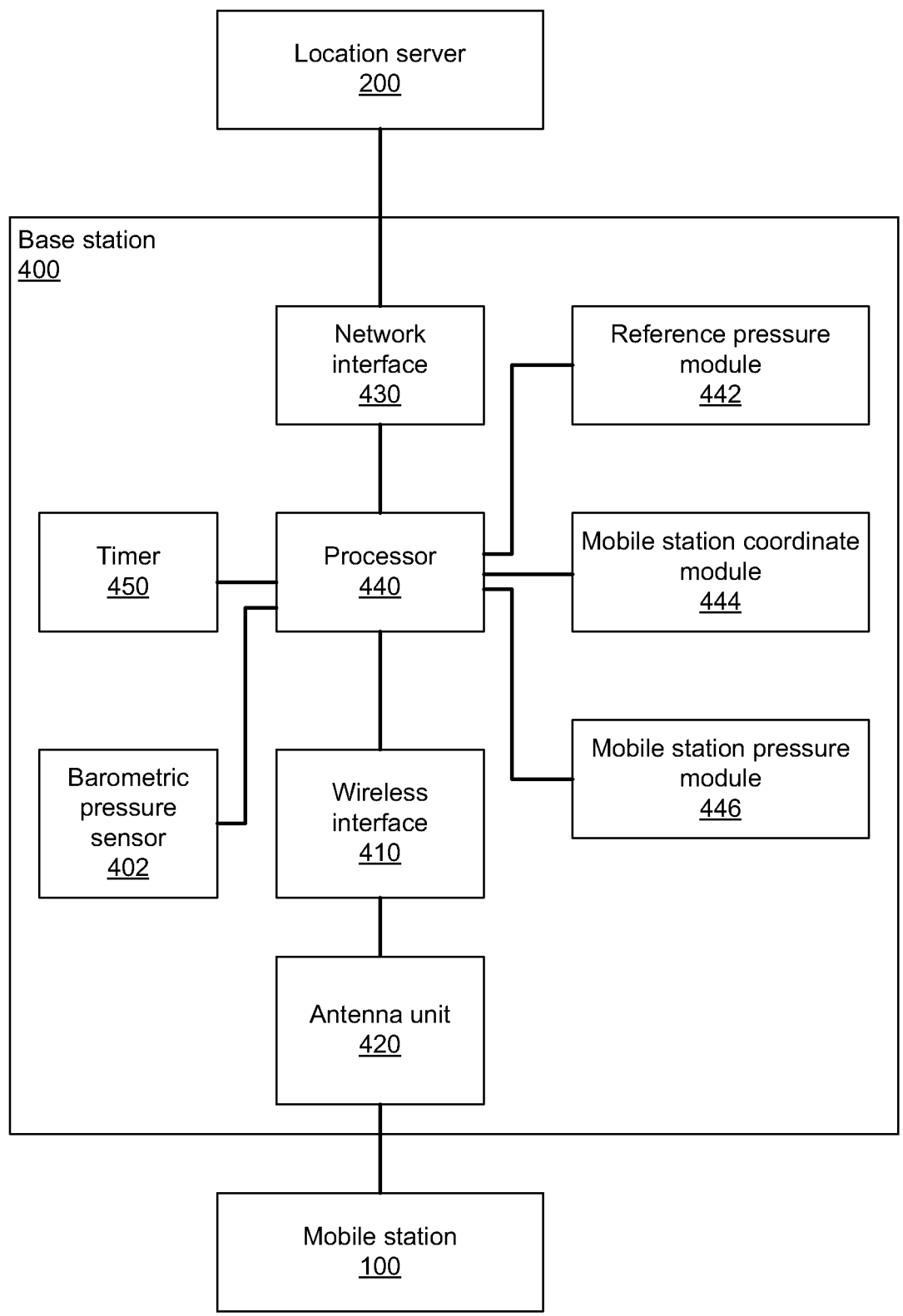
Figure 21:
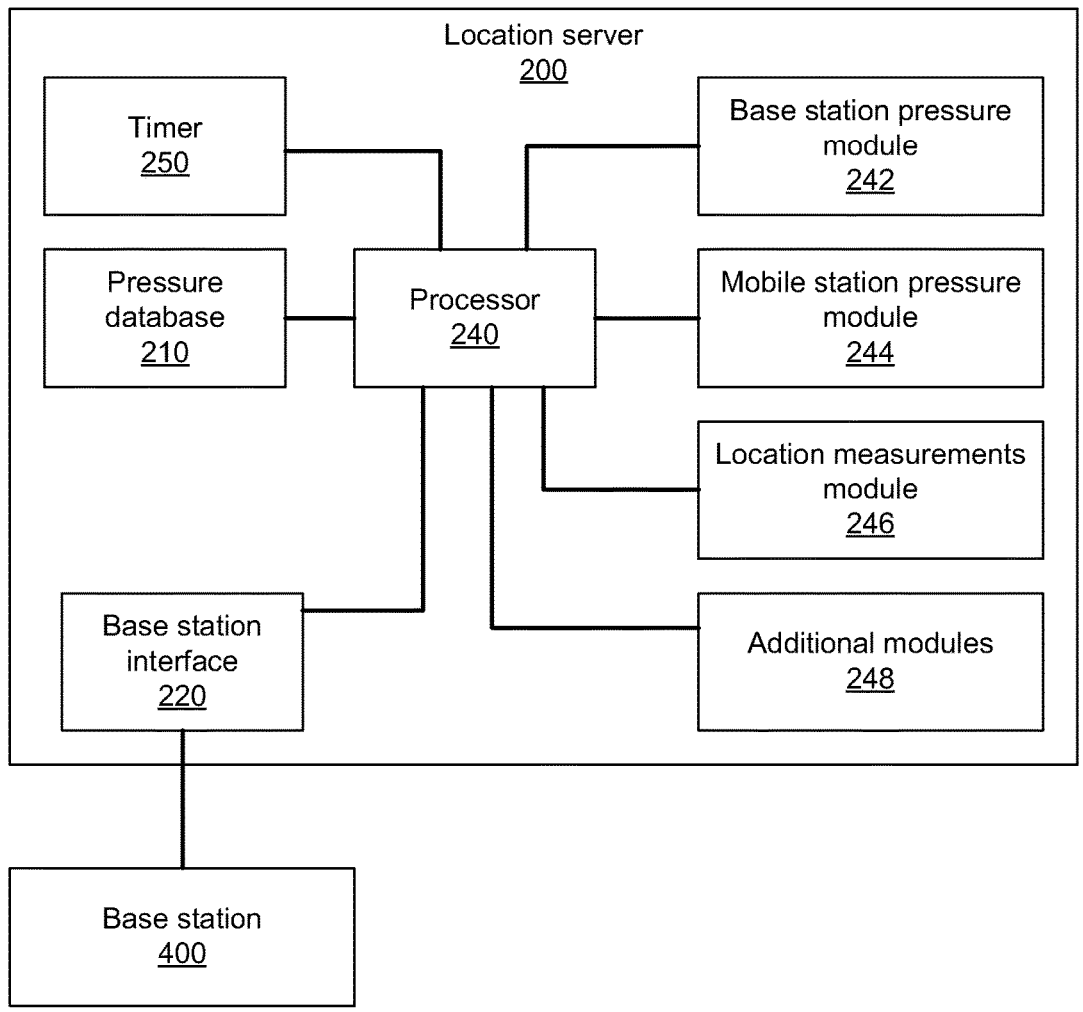

FIGS. 19-21 show block diagrams of a mobile station 100, a base station 400 and a location server 200, respectively, in accordance with some embodiments of the present invention. In FIG. 19, a mobile station 100 includes one or more sensors 110 (e.g., one or more accelerometers 112, one or more gyroscopes 114 and a barometric pressure sensor 116), a GNSS unit 120 (e.g., a GPS receiver), a processor 130, a display 160, a wireless interface 170 and an antenna unit 180. The processor 130 is coupled with the sensors 110, the GNSS unit 120 and the display 160. The processor 130 includes one or more modules 150, such as sensor module 152 to process data to and from the sensors 110, and a GNSS module 158 to process data from the GNSS unit 120. The wireless interface 170 couples the processor 130 to a base station 400 via the antenna unit 180. The wireless interface 170 and GNSS unit 120 are both coupled with an antenna unit 180. The antenna unit 180 may include one antenna or more than one antenna. The antenna unit 180 may include one antenna for the GNSS unit 120 to receive communications from GNSS satellites 500. The antenna unit 180 may include a second antenna for the wireless interface 170 to communicate with the base station 400. In some implementations, GNSS unit 120 and wireless interface 170 may share a common antenna or a common set of antennas within antenna unit 180.

In FIG. 20, a base station 400 includes a barometric pressure sensor 402. The barometric pressure sensor 402 may also be separate from the base station 400. The base station 400 also includes a wireless interface 410, an antenna unit 420, a network interface 430, a processor 440 and a timer 450. The wireless interface 410 couples the processor 440 to a mobile station 100. The network interface 430 couples the base station to various network entities such as a base station controller (BSC) and a location server 200. The processor 440 includes a reference pressure module 442 to receive pressure measurement from the barometric pressure sensor 402, convert the raw pressure sensor measurements into reference pressure values (e.g., a pressure for the position of the barometric pressure sensor 402 adjusted to sea level), and send the reference pressure values to a location server 200 via the network interface 430. The base station 400 may also send the coordinates (x,y) and/or the altitude of the barometric pressure sensor 402 to the location server 200. The processor 440 also includes a mobile station coordinate module 444 to obtain coordinates (x,y) of a mobile station and a mobile station pressure module 446 to send the reference pressure to the mobile station 100. The timer 450 provides the processor 440 with timestamps to timestamp measurements from the barometric pressure sensor 402. Measurements from the barometric pressure sensor 402 lose usefulness as more time elapses. The wireless interface 410 is coupled with the antenna unit 420 to support wireless transmission and reception (e.g., to and from a mobile station 100).

In FIG. 21, a location server 200 includes a pressure database 210, a base station interface 220, a processor 240 and a timer 250. The pressure database 210 may contain information about base stations 400 and contains pressure received from base stations 400. The base station interface 220 couples the location server 200 to a base station 400. The processor 240 is coupled to the pressure database 210 and the base station interface 220. The processor 240 includes a base station pressure module 242 to receive pressure from a base station 400 and act as a means for saving the pressure to the pressure database 210. The pressure from the base station 400 may be a reference pressure for a reference altitude (e.g., at sea level) at the location of the base station 400, or alternatively, at the location of the base station pressure module 242. The base station pressure module 242 may also act as a means for obtaining and saving the location (x,y) and altitude (z) of the barometric pressure sensor 402 to the pressure database 210. The processor 240 also contains a mobile station pressure module 244, which acts as a means for obtaining or determining coordinates (x,y) of a mobile station, estimating a pressure for the coordinates (x,y) at a reference altitude, and sending the pressure to the mobile station. The estimated pressure for the coordinates (x,y) may comprise interpolating and/or extrapolating points in space from a pressure database 210 representing surrounding base stations 400. The mobile station pressure module 244 may also determine a trend in direction of pressures across time from the pressure database 210. For example, if pressure increases by one unit every hour for three hours, pressure after the elapse of a further half of an hour may be extrapolated to ½ an additional unit. The processor 240 also contains a location measurements module 246, which receives location measurements from a mobile station and determines coordinates (x,y) based on the location measurements. Additional modules 248 may be included to determine an altitude based on a difference of a pressure received from a mobile station and an estimated pressure at a reference altitude. This altitude may be sent to a mobile station 100. The timer 250 may be used to timestamp pressure data so that stale pressure data in the pressure database 210 is not used. Alternatively, the pressure data may be time stamped by the base station 400.

Described above are methods for finding an altitude of a mobile station 100 having a pressure sensor. The same methods may be used for finding the altitude of other devices, such as a barometric pressure sensor 402, having an unknown altitude, by substituting the mobile station 100 with the other device.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for determining an altitude of a base station, the method comprising:
    obtaining a measured pressure from a barometric pressure sensor;
    obtaining coordinates of the base station;
    estimating a pressure at a reference altitude for the coordinates of the base station;
    determining the altitude of the base station based on a difference of:
        the measured pressure; and
        the estimated pressure at the reference altitude;
    adjusting the altitude of the base station by a displacement to the barometric pressure sensor to result in an adjusted altitude of the base station; and
    computing an altitude of a mobile device based on the adjusted altitude of the base station.

2. The method of claim 1, wherein the method is performed in a location server.

3. The method of claim 1, wherein the reference altitude comprises sea level.

4. The method of claim 1, wherein obtaining the coordinates of the base station comprises receiving the coordinates of the base station from the base station.

5. The method of claim 1, wherein obtaining the coordinates of the base station comprises receiving the coordinates of the base station from a network.

6. The method of claim 1, further comprising:
    receiving the measured pressure of the barometric pressure sensor at a location server; and
    sending the adjusted altitude from the location server to the base station.

7. The method of claim 1, further comprising:
    receiving location measurements from the base station at a location server;
    wherein obtaining the coordinates of the base station comprises determining the coordinates of the base station based on the location measurements.

8. A location server for determining an altitude of a base station, the location server comprising:
    a receiver;
    a processor coupled to the receiver and configured to:
        obtain a measured pressure from a barometric pressure sensor;
        obtain coordinates of the base station;
        estimate a pressure at a reference altitude for the coordinates of the base station;
        determine the altitude of the base station based on a difference of:
            the measured pressure; and
            the estimated pressure at the reference altitude;
        adjust the altitude of the base station by a displacement to the barometric pressure sensor to result in an adjusted altitude of the base station; and
        compute an altitude of a mobile device based on the adjusted altitude of the base station.

9. The location server of claim 8, wherein the receiver is configured to receive the measured pressure from the base station.

10. The location server of claim 8, further comprising a transmitter coupled to the processor and to send the adjusted altitude to the base station.

11. A location server for determining an altitude of a base station, the location server comprising:
    means for obtaining a measured pressure from a barometric pressure sensor;
    means for obtaining coordinates of the base station;
    means for estimating a pressure at a reference altitude for the coordinates of the base station;
    means for determining the altitude of the base station based on a difference of:
        the measured pressure; and
        the estimated pressure at the reference altitude;
    means for adjusting the altitude of the base station by a displacement to the barometric pressure sensor to result in an adjusted altitude of the base station; and
    means for computing an altitude of a mobile device based on the adjusted altitude of the base station.

12. The location server of claim 11, wherein the means for obtaining the coordinates of the base station comprises means for receiving the coordinates of the base station from the base station.

13. The location server of claim 11, wherein the means for obtaining the coordinates of the base station comprises means for receiving the coordinates of the base station from a network.

14. The location server of claim 11, further comprising means for sending the adjusted altitude to the base station.

15. A non-transient computer-readable storage medium to determine an altitude of a base station, the non-transient computer-readable storage medium including program code stored thereon, comprising program code for enabling hardware to:
    obtain a measured pressure from a barometric pressure sensor;
    obtain coordinates of the base station;
    estimate a pressure at a reference altitude for the coordinates of the base station;
    determine the altitude for the base station based on a difference of:
        the measured pressure of the base station; and
        the estimated pressure at the reference altitude;
    adjusting the altitude of the base station by a displacement to the barometric pressure sensor to result in an adjusted altitude of the base station; and
    computing an altitude of a mobile device based on the adjusted altitude of the base station.

16. The non-transient computer-readable storage medium of claim 15, further comprising program code to send the adjusted altitude to the base station.

\* \* \* \* \*